United States Patent [19]

Kitaura et al.

[11] Patent Number: 4,575,212

[45] Date of Patent: Mar. 11, 1986

[54] CAMERA WITH AN IMPROVED FOCUS DETECTING SYSTEM

[75] Inventors: Mashio Kitaura, Tondabayashi; Norio Ishikawa, Osaka; Toshihiko Ishimura, Sakai, all of Japan

[73] Assignee: Minolta Camera Kabushiki Kaisha, Osaka, Japan

[21] Appl. No.: 565,353

[22] Filed: Dec. 27, 1983

[30] Foreign Application Priority Data

| Dec. 28, 1982 [JP] | Japan | 57-228776 |
| Feb. 18, 1983 [JP] | Japan | 58-26587 |
| Feb. 18, 1983 [JP] | Japan | 58-26588 |
| Feb. 18, 1983 [JP] | Japan | 58-26589 |

[51] Int. Cl.[4] .............................. G03B 3/00
[52] U.S. Cl. ................................... 354/409
[58] Field of Search .............. 354/409, 402, 405, 406, 354/407, 408

[56] References Cited

U.S. PATENT DOCUMENTS

| 4,434,362 | 2/1984 | Wilwerding | 354/402 |
| 4,470,683 | 9/1984 | Nakajima | 354/406 |
| 4,474,449 | 10/1984 | Kusaka | 354/408 |

FOREIGN PATENT DOCUMENTS 56-78811 6/1981 Japan.
57-72115 5/1982 Japan.

*Primary Examiner*—L. T. Hix
*Assistant Examiner*—David M. Gray
*Attorney, Agent, or Firm*—Price, Gess & Ubell

[57] ABSTRACT

A photographic camera provided with a focus detecting system having a device for periodically sensing a focus condition of the camera to repeatedly produce a signal in response to every periodical sensing of the focus condition so as to effect the focus detection according to the signal from the sensing device.

12 Claims, 22 Drawing Figures

Fig. 2
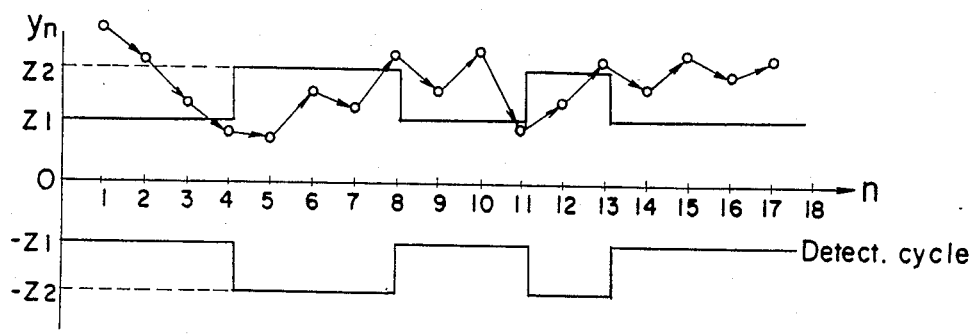
Fig. 2 (A)
× × ○ ○ ○ ○ ○ × ○ × ○ × ○ × ○ × Without hysteresis (Judg. std. $Z_2$)
Fig. 2 (B)
× × × ○ ○ ○ ○ × × × ○ ○ × × × × × With hysteresis
○ : In-focus display
× : Out-of-focus display
Fig. 3
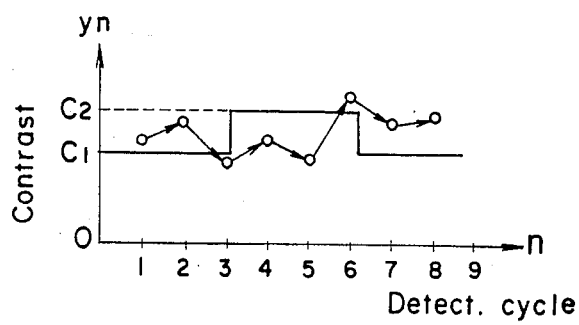
Fig.3 (A)  ○ ○ × ○ × ○ ○ ○   Without hysteresis (Judg. level $C_1$)
Fig.3 (B)  ○ ○ × × × ○ ○ ○   With hysteresis
○ : Display for focus det. possible
× : Display for focus det. impossible Fig. 12
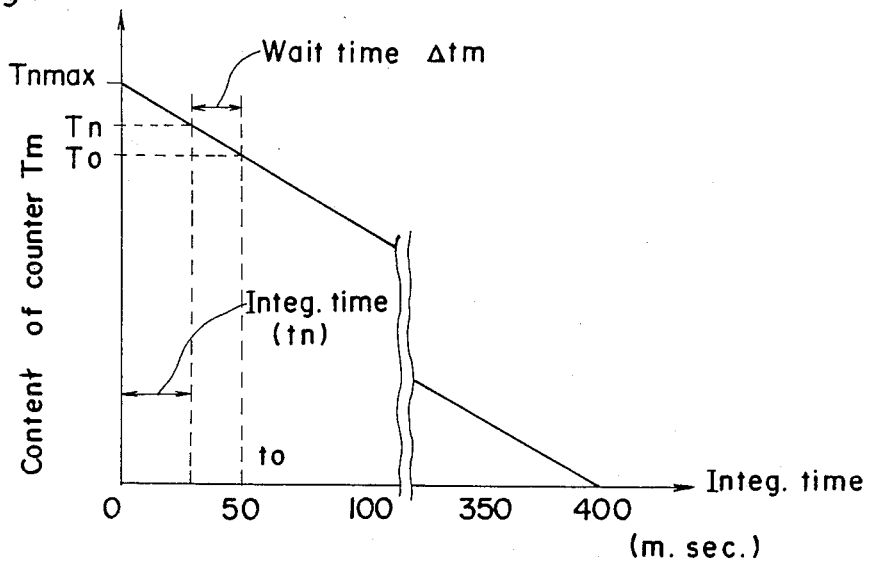
Fig. 13 (A) PRIOR ART
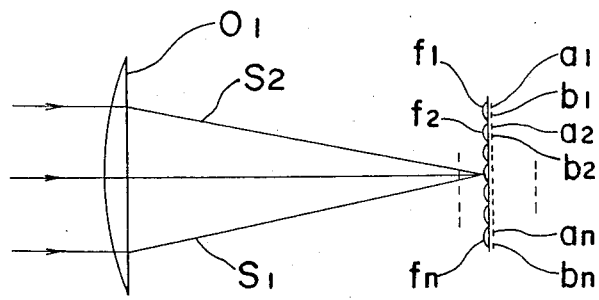
Fig. 13 (B) PRIOR ART
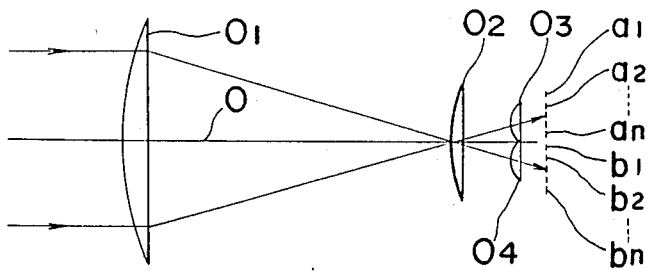

CAMERA WITH AN IMPROVED FOCUS DETECTING SYSTEM

BACKGROUND OF THE INVENTION

1. Field of the Invention

The present invention generally relates to a photographic camera provided with a focus detecting system for detecting a focusing condition of an objective lens and more particularly, to an improvement of a camera provided with a focus detecting system having means for periodically sensing a focus condition of the camera to repeatedly produce a signal in response to every periodical sensing of the focus condition so as to effect the focus detection according to the signal.

2. Description of the Prior Art

Conventionally, there has been proposed a single lens reflex camera which is so arranged that, by detecting the focusing condition of an objective lens, an in-focus display is effected in the field of a viewfinder if the position of the objective lens is within a predetermined in-focus zone, while on the other hand, when the position of the objective lens is out of the in-focus zone, a direction for rotating a focusing ring of the objective lens barrel is indicated in the viewfinder according to a state of front focus or rear focus. For actual photographing by the use of the camera as described above, a photographer may manually effect the focus adjustment according to the indications in the viewfinder until the display for the in-focus state appears, and thus, the focus adjustment of the photographic camera is facilitated.

The focusing condition detecting arrangement as described above is provided with a CCD (charge coupled device) as light receiving elements for periodical integration of photo-current, and the integration output thereof is subjected to calculation based on a predetermined equation so as to intermittently produce a defocus signal indicating a direction of deviation of the objective lens from the in-focus position and the size of such deviation. The defocus signal as described above shows a scattering or dispersion with a certain distribution width each time it is produced, even when an object to be photographed is located at a constant distance. This is considered to be a phenomenon arising from the fact that a point on the object to be photographed aimed at by the focusing condition detecting arrangement changes through the movement of hands holding the camera and also the object itself may tend to move, and further, that the focusing condition detecting arrangement itself is not free from noises, and has a certain limitation in its performance, etc. If there is a dispersion in the defocus signal as described above, in the case where it is arranged to judge whether or not the defocus signal has entered a predetermined judging zone so as to effect the in-focus display if entered, and, to give the out-of-focus display if not entered, undesirable phenomena as follows are brought about.

More specifically, in such a case that an image is fortunately positioned at a central portion of an in-focus zone as a result of manual adjustment of the objective lens, the dispersion of the defocus signal at each output is within a width of the judging zone at all times, and therefore, the focusing condition judging result is always of the in-focus, thus inviting no particular problems. However, the image of the objective lens is not necessarily located at the central portion of the in-focus zone, but in some cases, is positioned close to a boundary with respect to the out-of-focus zone instead of its central portion, although located in the in-focus zone. In such a case as described above, there arises such a disadvantage that, although the defocus signal at a certain detecting cycle enters the judging zone, that of another detecting cycle does not enter the judging zone because of the above mentioned dispersion thereof, thus being undesirably judged as being out-of-focus. Thus, displays both for the in-focus and out-of-focus appear alternately so as to be regarded as an unstable display by the photographer for his discomfort. As a result, operations for the focusing become very difficult and time-taking.

Meanwhile, in the case where the focusing condition detection is effected through employment of a charge accumulation type sensor array, the photo-sensor of this type repeats such a function that, through integration of photo-current by a time corresponding to the brightness of incident light, the focusing condition of the objective lens is detected by calculation processing based on the integrating data. More specifically, the period for repeating the focus condition detecting function is varied according to the brightness of the object to be photographed, and becomes shorter as the brightness increases. Therefore, under the state where the result of judgement varies for each detecting cycle as described above, the variation becomes rapid and conspicuous as the brightness of the object to be photographed increases, with a consequent increase in the unstability of the display.

Meanwhile, in a case where the focusing condition is to be judged based on the state of distribution of brightness on the image of the object to be photographed, the judgement or determination of the focusing condition becomes difficult, if the object to be photographed has an insufficient contrast.

Accordingly, there has conventionally been proposed a photographic camera which is so arranged that, the contrast of an object to be photographed is detected for comparison thereof with a predetermined reference level, and in the case where said contrast does not reach the reference level, a warning is given for display to tell that the desired focus detection is impossible.

In the photographic camera as described above, for example, when the contrast of the object to be photographed becomes almost equal to that of the predetermined reference level, the detected contrast undesirably fluctuates to be above or below the reference level even during focusing, due to various erroneous factors such as variations in the object itself to be photographed, noises and the like in a contrast detection circuit, etc. to provide an unstable state in which the warning is effected or interrupted rapidly, thus confusing a user of the photographic camera.

With respect to the problems as described in the foregoing, there has conventionally been attempted to stabilize the judgement or determination for the improvement, but such a stabilization of judgement has undesirably led, as it is, to deterioration in the response of the judgement.

SUMMARY OF THE INVENTION

Accordingly, an essential object of the present invention is to provide a photographic camera provided with a focus detecting system in which a judgement i.e. determination thereby is stabilized without deteriorating the response of the judgement.

Another object of the present invention is to provide a photographic camera of the above described type in which the judgement of an in-focus state in the focus detecting system is stabilized, particularly without any deterioration in the response of the in-focus state judgement.

A further object of the present invention is to provide a photographic camera of the above described type in which a warning display for indicating that the focusing condition detection is impossible in the focus detecting system is stabilized, especially without any deterioration in the response of said warning display.

Still another object of the present invention is to provide a photographic camera of the above described type in which the judgement of the in-focus state is stabilized without any deterioration in the response of said judgement, even in a focus detecting system of a type in which a repeating period for the focusing condition detecting function is varied according to the intensity of light of an object to be photographed.

In connection with the above, to stabilize the in-focus state judgement or determination without impairing the response of the judgement has the following meanings. It is needless to say that the display of the in-focus condition has for its ultimate object to aid a photographer to bring the objective lens into an in-focus condition. So, in a situation that the photographer is manually moving the objective lens, for example, from a long distance to a short distance, if a delay is present in the in-focus display in response, there may arise such an inconvenience that the display continues the out-of-focus judgement even when the object lens has entered the in-focus range, and is changed over to the in-focus state only after the objective lens has passed through the in-focus range. Thus, it is intended to stabilize the display, particularly without inviting any inconvenience as described above.

In accomplishing these and other objects, according to the present invention, there is provided a camera with an improved focus detecting system which comprises means for periodically sensing a focus condition of the camera to repeatedly produce a first signal in response to every periodical sensing of the focus condition, means responsive to the first signal for periodically determining whether the level of the first signal is at one side of a reference level or at the other side of the reference level with respect to every first signal repeatedly produced, means responsive to the determining means for informing that the first signal is at one side of the reference level and means responsive to the determining means for placing a resistance on the change from the appearance to the disappearance of the information of said informing means in comparison with the change from the disappearance to the appearance thereof, when the result of determination is that the first signal is at the one side of the reference level.

More in detail, the present invention is characterized in that the first signal is representative of the defocusing degree, and the reference level is representative of a limit of intolerable defocusing degree to cause the information of in-focus condition by the informing means when the defocusing degree less than the reference level at the one side thereof is determined by the determining means.

More specifically, the present invention as described above is further characterized in that the resistance means includes means for modifying the first signal subject to the determination by the determining means so that the first signal to be determined is influenced by the preceding first signal when the result of the preceding determination is that the first signal is at the one side of the reference level, whereby, when the first signal advances toward the other side than the preceding first signal, the first signal to be determined is shifted toward the one side with the appearance of the in-focus information than in a case of the disappearance thereof to reduce the possibility of change from the appearance to the disappearance of the information than that from the disappearance to the appearance thereof.

In another specific feature, the present invention is also characterized in that the resistance means includes means for shifting the reference level toward the other side when the result of the determination by the determining means is that the first signal is at the one side of the reference level, whereby the possibility of change from the appearance to the disappearance of the in-focus information is reduced than that from the disappearance to the appearance thereof.

Furthermore, in the case where the sensing means is of a photosensitive type and includes means for increasing the repetition rate of producing the first signal in accordance with the increasing of light to be sensed, the present invention is specifically characterized in that the resistence means includes means for setting a limit to the increase of the repetition rate when the result of the determination by the determining means is that the first signal is at the one side of the reference level, whereby the changing speed from the appearance to the disappearance of the in-focus information is restrained in comparison with that from the disappearance to the appearance thereof when the sensed light is so increased as to cause the increase of the repetition rate of producing the first signal over the limit.

On the other hand, still another feature in detail of the present invention is such that the first signal is representative of the detectability of focus condition, and the reference level is representative of a limit of successfully detecting the focus condition to cause the information of indetectable condition by the informing means when the detectability less than the reference level at the one side thereof is determined by the determining means, while the resistance means includes means for shifting the reference level toward the other side when the result of determination by the determining means is that the first signal is at the one side of the reference level, whereby the possibility of change from the appearance to the disappearance of warning information is reduced than that from the disappearance to the appearance thereof.

In any of the features according to the present invention as described so far, the response in the determination i.e. judgement is not deteriorated, and the stability of determination has been advantageously improved.

BRIEF DESCRIPTION OF THE DRAWINGS

These and other objects and features of the present invention will become apparent from the following description taken in conjunction with the preferred embodiments thereof with reference to the accompanying drawings, in which:

FIG. 2 is a graph explanatory of the focusing condition detection by the system of FIG. 1;

FIGS. 2(A) and 2(B) are diagrams showing examples of displays for the in-focus and the out-of-focus states;

FIG. 3 is a graph explanatory of the judgement or determination of contrast by the system of FIG. 1;

FIGS. 3(A) and 3(B) are diagrams showing examples of displays indicating that the focus condition detection is possible or impossible.;

FIG. 12 is a graph explanatory of a function for limiting the minimum of integrating time of CCD (charge coupled device);

FIGS. 13(A) and 13(B) are schematic side elevational views respectively showing optical portions of conventional focusing condition detecting means;

DETAILED DESCRIPTION OF THE INVENTION

Figure 1:
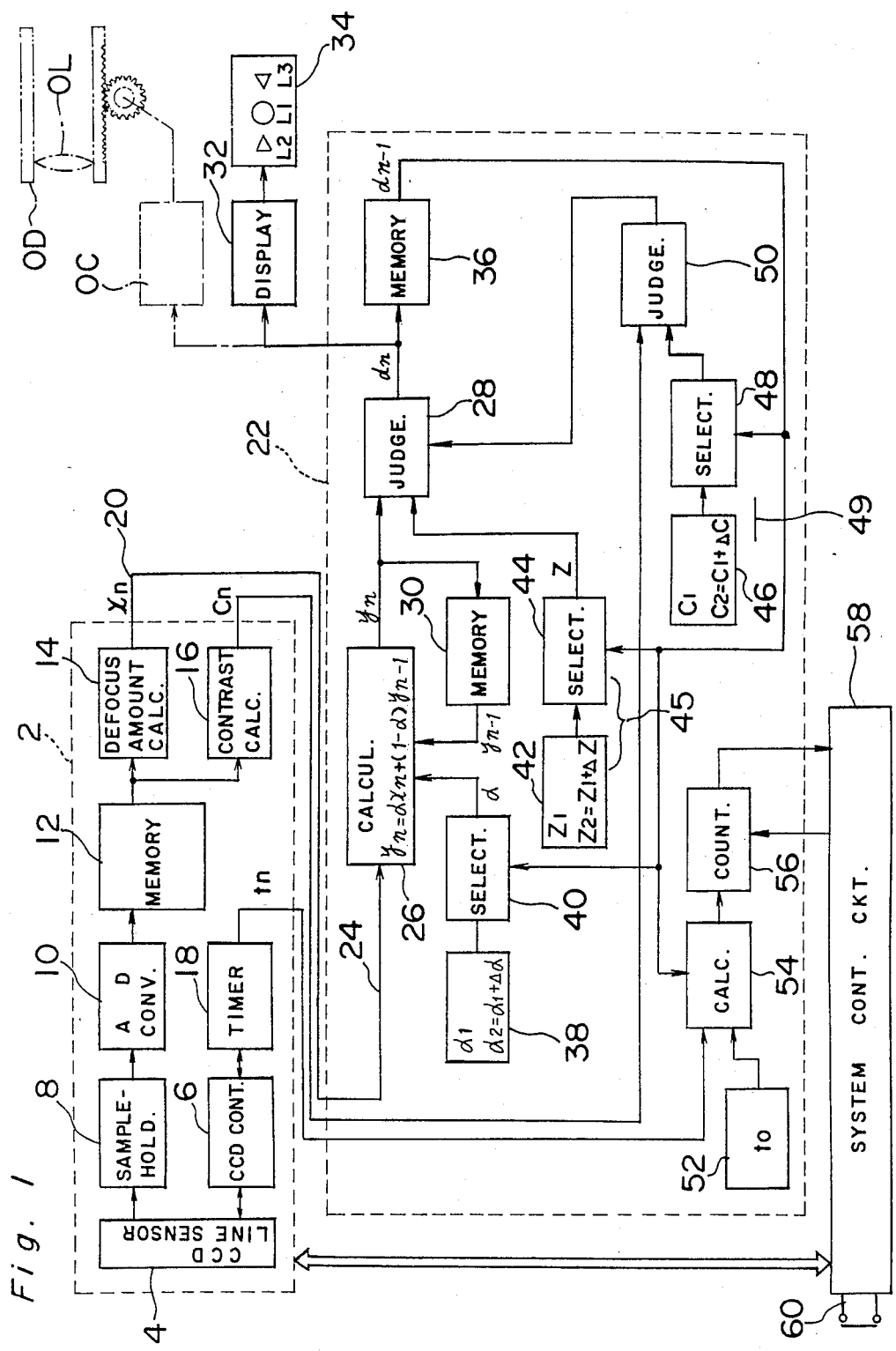
FIG. 1 is an electrical block diagram showing a general construction of a focus detecting system for a photographic camera according to one preferred embodiment of the present invention.

Before the description of the present invention proceeds, it is to be noted that like parts are designated by like reference numerals throughout the accompanying drawings.

For grasping a general concept of the present invention, an outline of the embodiment shown in FIG. 1 will be first explained hereinbelow.

The focus detecting system of FIG. 1 generally comprises a focusing condition detecting portion or block 2 (surrounded by dotted lines) which includes a CCD (charge coupled device) line sensor 4 provided at a light receiving portion, and connected to a defocus amount calculating circuit 14 and contrast calculating circuit 16 through a sample hold circuit 8, an A-D converter 10 and a memory circuit 12, and also coupled to a timer 18 through a CCD control circuit 6. The system in FIG. 1 further comprises a display stabilizing circuit 22 (also surrounded by dotted lines) which includes a contrast judging circuit 50 responsive to the contrast calculating circuit 16 of the focusing condition detecting portion 2, and to a constant number storing circuit 46 through a selecting circuit 48, to govern the function of a focusing condition judging circuit 28 which is connected to a display means 34 within a viewfinder through a display circuit 32. The focusing condition judging circuit 28 is also connected to a memory circuit 36. A second hysteresis circuit 49 for imparting a hysteresis characteristic to the judging circuit 50 is constituted by the constant number storing circuit 46 and the selecting circuit 48 which is responsive to the memory circuit 36. A calculating circuit 26 is inserted between the defocus amount calculation circuit 14 of the focusing condition detecting portion 2 and the judging circuit 28. A memory circuit 30 is connected to the calculating circuit 26 to store the output thereof and to return it to calculating circuit 26. A constant number storing circuit 38 is also coupled to the calculating circuit 26 through a selecting circuit 40 which is controlled by the memory circuit 36. A calculating circuit 54 which is also controlled by the memory circuit 36 is responsive to the timer 18 in the focusing condition detecting portion 2 and a constant number storing circuit 52, and connected to a counter 56 which is in communication with a system control circuit 58 to which a detecting switch 60 is connected. A constant number storing circuit 42 is connected to the judging circuit 28 through a selecting circuit 44 which is governed by the memory circuit 36.

In the arrangement of FIG. 1, a first main function of the block 2 for the defocus detecting element is to repeatedly produce a defocus signal, i.e. a signal $x_n$ indicating an amount (or length) by which a position of an image formed by an objective lens is deviated from a predetermined image forming plane i.e. from a film surface to be exposed, either forwardly or rearwardly with respect to said film surface (the signal will be referred to as a defocus signal, defocus amount or defocusing degree hereinafter). A second main function of the block 2 is to produce a contrast signal Cn indicating an extent of contrast possessed by an object from which the defocus signal is to be detected. Here, the contrast signal is a signal indicating a difference between respective luminances at a different two points on the object to be dealt with, and for obtaining such a signal, it may be so arranged, for example, that, by obtaining an absolute value of a difference between outputs of neighboring cells in the line sensor 4 included in the defocus detecting element 2, a total sum of such values is calculated so as to be utilized as the contrast signal. The contrast signal is also output repeatedly in the similar manner as in the defocus signal, and is used for the judgement as to whether or not an object has a sufficient contrast to provide the defocus signal as is described more in detail later. A third important function of the block 2 is to produce an integrating time signal tn indicating a photocurrent integrating time of the line sensor 4.

Meanwhile, the display stabilizing circuit 22 is so arranged that the state of information display at the display means 34 mainly indicating the state of focus adjustment condition of the objective lens may appear to be stable for an observer by introducing four kinds of signal processing means as described hereinbelow. According to the output of the display stabilizing circuit 22, in the case where the objective lens is in the state of in-focus with respect to the object to be photographed, a display element L1 (e.g. a light emitting diode) included in the display means 34 is actuated, while in the case where the objective lens is in the state of out-of-focus at a front focus, a display element L2 is actuated. Furthermore, if the objective lens is at a rear focus in the above state, a display element L3 is energized. These display elements L1, L2 and L3 are provided at suitable positions in a camera body so as to be readily observed within the viewfinder.

Subsequently, a first signal processing means for stabilization of the state of display is concerned with a relation between the defocus signal and a predetermined defocus judging or reference level, and in order to describe this first signal processing means referred to above, the calculating circuit 26 is omitted for convenience in explanation (since the calculating circuit 26 included in the display stabilizing circuit 22 to be described later is not directly related to this case), and it is assumed that the defocus signal $x_n$ is directly applied to one of the inputs of the judging circuit 28 (Accordingly, it is assumed to be $y_n = x_n$ at all times). It is to be noted here that a suffix n for the defocus signal $x_n$ indicates that the defocus signal is an output of an nth detecting cycle from the starting of the defocus detecting function. Incidentally, to the other input of the judging circuit 28, a predetermined focus judging or determinating level Z is applied. For the above judging level values, values Z1 and Z2 having sizes different from each other are prepared in the storing means 42, and at the first detecting cycle, the value Z1 (Z1<Z2) is applied to the judging circuit 28 through the selecting circuit 44. Additionally, if the defocus signal $x_1$ detected at the first detecting cycle is in the relation $x_1$>Z1, the value Z1 is successively applied. In the process through which the objective lens is manually shifted in a direction along its optical axis for effecting the focusing condition adjustment, when the defocus signal $x_n$ at the nth detecting cycle becomes smaller than the value Z1, the judging circuit 28 produces a signal dn indicating that the objective lens has entered the state of in-focus, with the signal dn being simultaneously stored in the memory circuit 36. It is to be noted here that, in the foregoing description, the judging level with respect to the defocus signal $x_n$ is assumed to be Z1. In order to assure such a selecting of the value Z1 at an initial stage for application to the judging circuit 28, the signal indicative of out-of-focus is initialized in the memory circuit 36 at the first detecting cycle.

As is understood by the above explanation, in the case where the signal stored in the memory circuit 36 is one indicative of the out-of-focus state, the selecting circuit 44 selects the judging level value Z1, while, if the signal is one indicative of the in-focus state, the circuit 44 selects the judging level value Z2. Accordingly, when the judgement for the in-focus is made, with the defocus signal $x_n$ being smaller than the value Z1 as in the above example, the value Z2 in place of Z1 is given as the judging level value with respect to the defocus signal $x_{n+1}$ at an (n+1)th detecting cycle, with a consequent shifting of the focusing condition judging level to a slightly less strict one. Accordingly, in the n+1st detecting cycle, even when the defocus signal $x_{n+1}$ becomes slightly larger than $x_n$, if such defocus signal $x_{n+1}$ is one which satisfies the relation $x_{n+1}$<Z2, the state is still determined as the in-focus by the judging circuit 28. On the contrary, supposing a case wherein the defocus signal $x_{n+1}$ is in the relation Z1<$x_{n+1}$<Z2, with only the unchangeable level Z1 being given to the judging circuit 28 as the judging level value, the state would be judged as out-of-focus, and in the display device 34, the state of display is changed over from the element L1 to the element L2 or L3. However, by arranging to provide the value Z2 as the judging level value, when the relation is Z1<$x_{n+1}$<Zn, the element L1 is continuously actuated, and thus, the state of in-focus display appears to be stable to the observer.

Referring also to a graph of FIG. 2 for explaining the effect of the embodiment of FIG. 1, numbers marked on an abscissa show the output order of the defocus signals as produced from the defocus detecting portion 2, while a symbol $y_n$ on an ordinate may be considered to represent a defocus amount output from the defocus detecting portion 2, since the relation is $y_n = x_n$ in this case, with a variation of $y_n$ as shown by folded lines. In the graph of FIG. 2, the portion from the number 1 to number 4 is a process in which the objective lens is moved towards the in-focus position. The set level for giving a narrow in-focus zone is represented by Z1, and that for giving a wide in-focus zone is denoted by Z2.

In a diagram of FIG. 2(B) showing the displays which appear in the arrangement as described so far, a symbol indicates a case where the in-focus display appears, while a symbol X represents the out-of-focus display, and these symbols are arranged to correspond to the numbers on the abscissa in the graph of FIG. 2. Since the in-focus zone is initially narrow, the state is of the out-of-focus up to the third stage, and enters in the in-focus zone at the fourth stage, where the in-focus zone is changed over to the wide side. On and after the fifth stage up to the eighth stage, it is shown that the defocus amount will vary in a natural manner even when the objective lens is not manually moved, and the defocus amount goes out of the wide in-focus zone at the eighth stage, so that the in-focus display is continued from the fourth stage to the seventh stage. At the eighth stage, the in-focus zone is again changed over to the narrow side and thus, FIG. 2(B) may be understood in the similar manner thereafter.

In a diagram of FIG. 2(A) showing, in the similar manner as in FIG. 2(B), the flickering of the in-focus display with respect to a case where the in-focus zone is supposed to be fixed only at Z2, the number of frequency of the flickering of the in-focus display is increased as compared with the case of FIG. 2(B), and thus, it is shown that the effect of stabilizing the focusing condition display can be obtained by the arrangement according to the present invention.

By the above arrangement according to the present invention, in the case where the objective lens is adjusted from the out-of-focus state to the in-focus state, since the adjustment is first made by aiming at the narrow in-focus zone, high accuracy in the focusing condition adjustment may be achieved. Subsequently, upon entrance into the in-focus zone, the width of the in-focus zone is expanded, and therefore, the flickering of the in-focus display due to dispersion of the defocus signal at each detecting cycle may be avoided. Thus, not only the accuracy in the focus adjustment is guaranteed, but the focusing condition display is fully stabilized for a smooth focus adjustment according to the state of display.

Subsequently, a second signal processing means for the stabilization of the state of display will be explained hereinbelow. In this second means, it is so arranged that, in the case where an object to be dealt with is extremely bright and consequently, the integrating time of the line sensor becomes very short, the period for one detecting cycle including the integrating time and the time required for processing the information from the line sensor as obtained by the integration, is adapted not to become shorter than a predetermined time only when the in-focus display is given. The integrating time of the line sensor 4 is varied, for example, in the range from 40 $\mu$ sec to 400 m sec according to the brightness of the object. Meanwhile, from the termination of the integration by the line sensor 4 until the defocus detecting element 2 produces an output by processing the defocus signal based on the above output, it takes, for example, about 40 m sec. Accordingly, in the integrating time, for example, of 40 $\mu$ sec, the time required for one detecting cycle becomes approximately 40 m sec which is equal to the time required for the signal processing, with the number of detecting cycles being 22 times or thereabout per second. In the case as described above, when the defocus signals produced at respective detecting cycles are dispersed in the vicinity of the focus judging level, the display elements for the out-of-focus state and infocus state are rapidly and frequently turned on and off alternately, thus resulting in the embarrassment of the observer. Accordingly, if the number of detecting cycles per second is limited to 10 times at the maximum, the frequency of the on and off of the in-focus and out-of-focus display elements per a period is decreased as compared with the case without any limitation to the number of detecting cycles per second. According to the present invention, it should be noted here that, such limitation is applied only to a detecting cycle subsequent to the case where the in-focus judgement is made, and when the judgement of the out-of-focus is made, no limitation is applied.

As described above, in the case where the objective lens is in the in-focus state, while the integrating time of the line sensor becomes very short due to the increase of brightness of the object to be photographed, with the result that the number of detecting cycles per unit time becomes larger than the predetermined number, it is so arranged that a certain time period is added to each detecting cycle so as to prolong the period or duration of the respective detecting cycle, whereby the number of detecting cycles per unit time is reduced to the predetermined number. For example, if the maximum number of detecting cycles per second is desired to be set at 10 times at the maximum, the shortest period for one detecting cycle should be 100 m sec. Supposing that the shortest detecting cycle period without any addition of time period is 40 m sec, one detecting cycle period can be limited to 100 m sec at the shortest through addition of time in the range of 0 to 60 m sec in dependence on the brightness of the object to be dealt with.

Referring back to FIG. 1, in the focusing condition detecting portion 2, the timer circuit 18 detects the integrating time tn of the CCD in said portion, and the detecting signal therefrom is fed to the calculating circuit 54, which is preliminarily impressed with data equivalent to a predetermined integrating time t0, for example, of 60 m sec by the constant number storing circuit 52 so as to calculate t0-tn. Meanwhile, the counter 56 counts the clock pulses applied from the system control circuit 58 by $\Delta t = t0 - tn$, and feeds the count termination signal to the control circuit 58. Upon receipt of the above signal, the control circuit 58 causes the focusing condition detecting portion 2 to start the subsequent focusing condition detecting function. The counter 56 immediately produces a signal for counting termination upon receipt of the data for $\Delta t$ from the calculating circuit 54 in the case where $\Delta t$ is 0 or negative. Accordingly, so far as tn is longer than the predetermined time t0, there is not any addition of time made, but the period for the focusing condition detecting function becomes the sum of the integrating time tn and a time T for processing the data of the result of the integration according to a predetermined program. On the contrary, in the case where the relation is tn<t0, time is added by a difference $\Delta t$ thereof counted by the counter 56, and the starting of the subsequent detecting function is instructed from the control circuit 58, and as a result, the period for the focusing condition detecting function becomes a constant value, for example, 100 m sec represented by t0+T.

It should be noted here that, in the present invention, the result of judgement for the in-focus state made by the judging circuit 28 (coded as "00" by the binary code) is stored in the memory circuit 36, and the above function is effected only during impression of this stored signal to the calculating circuit 54. As was also described earlier, the phenomenon in which the display rapidly changes between the in-focus state and out-of-focus state to the discomfort of photographer, takes place when the objective lens enters the region in the vicinity of the boundary between the in-focus and the out-of-focus. In other words, if the defocusing degree is large, since the display continues the indication of the out-of-focus state at all times so as to be stabilized, it is not necessary to set a limit to the period of the focus condition detecting function. It should rather be so arranged that, with the period being left as it is under the out-of-focus state without any limitation thereto, the above function is effected only after entering the in-focus zone, whereby the deterioration in the response from the out-of-focus state to the in-focus state is avoided, while the possibility that the out-of-focus display is undesirably given momentarily under the in-focus display state may also be held at a low level.

Hereinbelow, a third signal processing means will be described. This means is characterized in that an average of a defocus signal judged to be of in-focus and a defocus signal to be produced from the defocus detecting element 2 at the subsequent detecting cycle, is taken. The average value thus obtained is applied to the judging circuit 28 as a modified defocus signal for judgement as to whether such modified defocus signal is within or outside the in-focus range. On the other hand, if the first mentioned defocus signal is judged to be of the out-of-focus, the second mentioned defocus signal produced from the defocus detecting element 2 at the subsequent detecting cycle is not subject to the averaging, but judged as it is. In FIG. 1, the averaging is effected in the calculation circuit 26.

For the averaging, it is possible to employ various systems. In the present embodiment, the arrangement is so made that a weight $1-\alpha$ is imparted to a preceding output $y_{n-1}$ of the calculation circuit 26 stored in the memory circuit 30, while a weight $\alpha$ is given to the present data $x_n$ for taking the weighted average of $x_n$ and $y_{n-1}$. And, the result of such a weighted average is output to renew the former value in the memory circuit 30. This operation is repeated for each new defocus signal. Thus, the present weighted average $y_n$ can be generally expressed by an equation, $y_n = \alpha x_n + (1-\alpha)y_{n-1}$ in relation to the preceding weighted average $y_{n-1}$. By employing the averaging calculation processing as described above, all the past defocus signals are regarded as concentrated on $y_{n-1}$, since the equation has the following meaning:

$$y_n = \alpha x_n + (1-\alpha)\alpha x_{n-1} + (1-\alpha)^2 \alpha x_{n-2} + \ldots$$

Therefore, only two data memories $y_{n-1}$ and $x_n$ are sufficient for the purpose, although many defocus signals, $x_n, x_{n-1}, x_{n-2}, \ldots$ are dealt with. In other words, the effect in the actual design that the number of memories employed is reduced, can be obtained by the above construction. For the value of $\alpha$, two kinds of values $\alpha 1$ and $\alpha 2 = \alpha 1 + \Delta \alpha$ are preliminarily set in the constant number storing circuit 38 so as to use either one of $\alpha 1$ or $\alpha 2$ through selection by the selecting circuit 40. What is meant by $\alpha$ is such that, if $\alpha = 1$, only the present data $x_n$ is employed as $y_n$ without actually effecting the averaging calculation, while, if $\alpha = 0$, the last data $y_{n-1}$ is adopted as the average value $y_n$. So, the values for $\alpha$ is theoretically selectable in the range between 0 to 1, and more importance is placed on the present data as the above value for $\alpha$ increases in the range. In the present embodiment, two α values α1, α2 in the relation α2°α1 are prepared. And until the judgement for the infocus is produced from the judging circuit 28, α2 (e.g., α2=1) is employed for effecting the weighted average in which a greater importance is placed on the present data $x_n$. On the contrary, when the judgement for the in-focus is produced from the circuit 28, α1 (e.g., α1=1/2) is used so as to average the present and past data with the former effectively influenced by the latter. More specifically, the judging circuit 28 produces binary coded judging signals "00" in the case of the in-focus, and "01" for the front focus and "10" for the rear focus in the case of the out-of-focus, and the memory circuit 36 stores the last judging signal so as to control the selecting function of the selecting circuit 40 in the present calculation. As described above, the values of α are changed over between the large value and the small value before and after the in-focus condition judgement. Although described more in detail later, during the time the photographer is moving the objective lens towards the in-focus position in the out-of-focus condition, if a great importance were attached to the past data in averaging, the judging result would be drawn by the past data having a larger amount of deviation in the focusing than in the present data, with a consequent delay of judgement in the response to the focus variation toward the in-focus condition. Therefore, α2 having the larger value as α is selected during the out-of-focus condition. And, the past data with a considerable weight is made effective to influence on the present data only after the lens is brought into the in-focus condition, where the objective lens is hardly moved after the in-focus judgement is given.

Subsequently, a fourth signal processing means will be described hereinbelow.

Generally, in an arrangement adapted to detect the state of focusing adjustment of an objective lens through utilization of a contrast of an object to be focused, it becomes impossible to effect a normal detecting function when the contrast of the object becomes lower than a certain level. So, some means for detecting such an incapable condition to warn the photographer is needed. However, in the case where the contrast of the object is present in the vicinity of a limit level capable of effecting the normal function, there is such a tendency that the detected contrast may fluctuate above and below the limit level. As a result, the warning would alternatingly appear and disappear to the bewilderment of the photographer. Accordingly, order to suppress the occurrence of such alternate appearance and disappearance of a warning, two judging levels are selected having different sizes from each other are prepared for a comparison with the contrast, and in the case where it is judged that the focus detection is impossible at a certain detecting cycle, the larger one of the two judging levels is applied to the contrast judging circuit 50 for the detection of contrast (in the similar manner as in the previous case where the two focusing condition judging levels, Z1 and Z2 are prepared so as to select the judging level for the subsequent judgement by the circuit 28 according to the result of the preceding judgement of the focusing condition). Meanwhile, in the case where it is judged that the detection is possible, the smaller judging level is given with respect to the subsequent judgement. As is clear from FIG. 1, the contrast signal Cn is applied to the contrast judging circuit 50 at each detecting cycle.

To the judging circuit 50, either one of the two high and low reference levels C1 and C1+ΔC preliminarily prepared at the constant number storing circuit 46 and selected by the selecting circuit 48 is applied. The result of judgement by the judging circuit 50 is fed to the judging circuit 28 for the focusing condition. As has been already explained, the judging circuit 28 normally controls the display circuit 32 according to the focusing condition for effecting the display of in-focus or out-of-focus condition by the display means 34 within the viewfinder. When a judging signal lower than the reference level (low contrast) is fed from the judging circuit 50, the judging circuit 28 produces a signal that the detection is impossible, so that triangular marks of light emitting diodes L2 and L3 (each of which normally indicates a direction for rotating a focusing ring of the objective lens by the direction of its apex) in the display means 34 are simultaneously flickered for warning indication that the focus condition can not be detected. Simultaneously, the above signal for incapability of focus detection (which signal is coded as "11" by two bits as described later) is stored in the memory circuit 36, and by this memory, the selecting circuit 48 is operated. More specifically, in the case where the signal for incapable detection is not stored in the memory circuit 36, the reference level C1 is selected at the subsequent functioning cycle so as to be applied to the judging circuit 50, while on the contrary, when the signal for incapable detection is stored in said memory circuit 36, the reference level C2 is selected at the subsequent functioning cycle. As shown in a graph of FIG. 3, the reference level for giving the lower contrast level is represented by C1, and that for giving the higher contrast level is denoted by C2.

In a diagram of FIG. 3(B) showing how the displays appear in the above arrangement, a symbol O indicates a case capable of detecting the focusing condition, while a symbol X represents an appearance of warning, and these symbols are arranged to correspond to the numbers on the abscissa in the graph of FIG. 3. Since the initially set level is low, the focusing condition may be decided as detectable up to the second stage, and the warning appears at the third stage, where the set level is changed over to the high side C2. On and after the fourth stage up to the eighth stage, the contrast detected values vary at random. The contrast leaves below the higher level C2 until the fifth stage where the focusing condition is decided undetectable and the contrast becomes greater than the higher level C2 at the sixth stage, so that the focusing condition is decided detectable from the sixth stage to the eighth stage. It should be noted that, on or after the seventh judgement, the lower level C1 is again adopted.

In a diagram of FIG. 3(A) showing the appearance of warning with respect to a case where the focusing zone were fixed only at C1, the alternation between the appearance and disappearance of warning would be increased in the frequency as compared with the case of FIG. 3(B), and thus, it is shown that the effect of stabilizing the warning to indicate the incapability of focus condition detection, can be obtained by the arrangement according to the present invention.

It should be noted here that, although the fourth signal processing means as described so far is applied to the case where the focusing condition detection is effected based on the brightness distribution of an object to be photographed, such focusing condition detection depending on the brightness distribution is not limited to only the system described in the embodiment, in which the focusing condition detection is effected by subjecting the brightness distribution function to analytical calculations, but is also applicable to a system which detects the focusing condition, for example, by finding whether or not a contrast of light detected before a film equivalent plane is in agreement with that detected after a film equivalent plane.

Referring back to FIG. 1, the embodiment according to the present invention as briefly explained so far will be described in more detail hereinbelow.

In the focus detecting system of FIG. 1 for use, for example, in a single lens reflex camera, the light receiving portion of the focus condition detecting portion 2 is disposed at a bottom of a mirror box of the camera (not particularly shown), and light rays transmitted through the objective lens (not particularly shown) via a conventional optical system are led to said light receiving portion. For the focus condition detecting portion 2, for example, a conventional device known as TCL (name used in trade and manufactured by Honeywell, U.S.A.) may be employed. The focusing condition detecting device referred to above includes a line sensor 4 at the light receiving portion, and this CCD line sensor 4 is constituted by: a plurality of photo-diode cells arranged in arrays; means for integrating photo-currents produced by the cells upon receipt of light; and means for transferring the integrated charge to an output terminal structure, i.e., a CCD, which CCD (charge coupled device) is of the charge accumulation type photodetecting elements. By transferring the charge accumulated in a certain accumulating time for output, a predetermined algorithm calculating process is effected based on the above output so as to detect the defocus amount and direction thereof. Such detecting function is repeatedly effected and the defocus signal is produced intermittently.

Moreover, the focusing condition detecting portion 2 outputs every moment the signal proportional to the total amount of the integrated charge, which is dependent on the light amount incident on line sensor 4, and is provided with an AGC circuit which automatically stops the integrating function when said signal has reached the predetermined level. In other words, the arrangement is so made that the product of illuminance I at the light receiving surface and the integrating time t is maintained constant, and thus, the average level of the output is normally maintained generally constant so as to be convenient for the signal processing system at the later state, without depending on the brightness of the object to be photographed.

It is to be noted that the algorithm for calculating the defocus amount described in detail, for example, in Japanese Laid Open Patent Application Tokkaisho No. 57-45510 or U.S. Pat. No. 4,333,007 may be utilized for the present embodiment. For the contrast Cn of the object to be photographed, a value calculated, for example, based on the following equation may be adopted.

$$Cn = \sum_{i=1}^{n-1} |a_i - a_{i+1}|$$

where $a_i$ is an output of a CCD element $a_j$. The above equation represents a total of absolute values of differences of the outputs from the neighboring elements in the group of CCD elements a1, a2, a3..., and an, and the general trend is such that the total value Cn increases as the contrast of the object to be photographed becomes high. In the case of a "flat" object to be photographed without any contrast, the total value will be zero. The line sensor 4 in FIG. 1 is subjected to the controls such as the charge accumulation, transfer, etc. by the signal from the control circuit 6 in which the AGC circuit referred to earlier is included. Upon starting of the transfer function, voltage signals corresponding to the accumulated charge by respective photo-diodes are sequentially produced from the line sensor 4. The sample-hold circuit 8 temporarily holds the voltage signal from the line sensor 4. The A-D converter 10 converts the analog voltage held in the sample hold circuit 8 into digital values, which are sequentially stored in the memory circuit 12 at the preliminarily designated address. The information stored in the memory circuit 12 is applied to the calculating circuit 14 for the predetermined algorithm calculation processing, and thus, the defocus amount and its direction are calculated so as to be applied to an output line 20 as a defocus signal in the digital form. Meanwhile, the contrast calculating circuit 16 calculates from the information of the memory circuit 12, a signal representing an intensity of contrast of an image of the object to be photographed at its portion received by the line sensor 4. Moreover, the timer circuit 18 measures the charge accumulating time $t_n$ at the line sensor 4 at each detecting cycle for output.

Subsequently, the construction of the display stabilizing circuit 22 will be explained.

The calculating circuit 26 which is connected, at its input line 24, with an output line 20 from the defocus amount calculating circuit 14 of the focusing condition detecting portion 2, carries out the calculation represented by an equation as follows.

$$y_n = \alpha x_n + (1-\alpha) y_{n-1} \qquad (1)$$

where $x_n$ is a defocus signal by an nth detection cycle, $y_n$ is a calculation output of the calculating circuit 26 with respect to the defocus signal $x_n$, and $y_{n-1}$ is a calculation output of the calculating circuit 26 with respect to a defocus signal $x_{n-1}$ by an (n−1)th detection cycle, with either 1 or ½ being employed for $\alpha$ as described later.

It should be noted here that, with respect to the defocus signal $x_1$ at the first detecting cycle, the value for $\alpha$ is initialized as $\alpha = 1$, so that the relation is $y_1 = x_1$, with $x_1$ being output as $y_1$ as it is so as to be applied to the judging circuit 28 and the memory circuit 30 at the subsequent stage. In the case where the relation becomes $\alpha = \frac{1}{2}$ as described later, the calculating circuit 26 provides an average of the defocus signal $x_n$ of the latest detecting cycle and the signal $y_{n-1}$ obtained from the defocus signal prior to the above. Here, upon expansion of the equation (1) in the case where $\alpha = \frac{1}{2}$, an equation (2) as follows may be obtained.

$$y_n = \frac{1}{2} x_n + \frac{1}{2}\left(\frac{1}{2} x_{n-1} + \frac{1}{2} y_{n-2}\right) \qquad (2)$$

$$= \frac{1}{2} x_n + \frac{1}{2^2} x_{n-1} + \frac{1}{2^2} x_{n-2} + \ldots + \frac{1}{i} x_{n-i} + 1$$

As is clear from the above equation (2), the output of the calculating circuit 26 is intended to obtain a weighted average of a plurality of data in which the most importance is attached to the latest data, with the importance being gradually reduced as the data becomes old. The reason for the above arrangement is such that, since there are deviations in the defocus signals at the respective detecting cycles even with respect to the same distance as described earlier, it is intended to reduce the errors by taking the average of the plurality of defocus signals. In the above case, the greatest importance is placed on the latest data, with less importance being attached to the past data as described earlier due to the reason as follows. In the case where the objective lens remains stationary with respect to the film plane, with an object to be photographed being also located at a predetermined distance from the camera, it is not necessary to add weights to respective data for obtaining an average value of a plurality of defocus signals. In the actual practice, however, since the circumstances are such that the objective lens should manually be moved towards the in-focus position, with the distance between the object to be photographed and the camera being also changeable, if the latest defocus signal and the past defocus signal are equally weighted, the results will be largely affected by the factors of errors other than the deviations described earlier, and thus, a less weight is added to the past data.

The judging circuit 28 is arranged to compare the defocus signal $y_n$ from the calculating circuit 26 with a predetermined in-focus threshold value Z for judgement of the in-focus state or out-of-focus state so as to output the result $d_n$ in the form of two bit signals as shown in Table 1. According to the above output, any one of the light emitting diodes L1, L2 and L3 is lit. It is to be noted here that, in Table 1, C represents a one bit signal produced from the judging circuit 50 described later, and shows whether or not the contrast of the object to be photographed has reached a predetermined level. In the case where the contrast has not reached the predetermined level, the focusing condition detection is regarded as impossible and "11" is produced from the judging circuit 28 as the output $d_n$.

TABLE 1

| C | $y_n$:z | Result of judgement | Output $d_n$ | Display |
|---|---|---|---|---|
| 0 (Detection possible) | $\|y_n\| \leq z$ | In-focus | 00 | L1 lit |
| | $y_n > + z$ | Front focus | 01 | L2 lit |
| | $y_n < - z$ | Rear focus | 10 | L3 lit |
| 1 | | Detection impossible | 11 | L2, L3 flicker |

The display circuit 32 having the signal $d_n$ as its input, drives the light emitting diodes L1, L2 and L3 of the display means 34 of a conventional mode provided within the viewfinder of the camera.

The memory circuit 36 temporarily stores the signal $d_n$ until the output $y_{n+1}$ of the calculating circuit 26 with respect to the output $x_{n+1}$ at the (n+1)th detecting cycle is applied to the judging circuit 28, and feeds the stored value to the selecting circuits 40, 44 and 48 and the calculating circuit 54. For executing the calculation of the equation (1) employing the nth defocus signal $x_n$, the selecting circuit 40 selects for input to the calculating circuit 26, either one of two constants $\alpha_1 = 1$ of $\alpha_2 = \frac{1}{2}$ which is stored in the constant number storing circuit 38 according to the output $d_{n-1}$ of the judging circuit 28 with respect to the (n−1)th defocus signal $x_{n-1}$. In the case where the signal $d_{n-1}$ is "00" showing the in-focus state, the constant $\alpha_2 = \frac{1}{2}$ is selected, and the weighted average processing is effected retrospectively with respect to the past data from the latest defocus signal $x_n$ represented by the equation (2). In cases other than the in-focus state, the constant $\alpha_1 = 1$ is selected, and the calculating circuit 26 outputs the input $x_n$ as it is, as the output $y_n$. In other words, in the out-of-focus range, the objective lens is moved towards the in-focus range for changing its position every moment, and therefore, if the plurality of retrospective defocus signals obtained in the above case are subjected to the averaging processing, the result thereof is undesirably affected by the data in the out-of-focus state in the past even when the objective lens has actually reached the in-focus range, with a consequent deterioration in the response for the judgement of the in-focus state. Accordingly, the averaging processing is not effected in the above case.

Subsequently, the constant number storing circuit 42 and the selecting circuit 44 constitute a first hysteresis circuit 45 for imparting a hysteresis characteristic to the judging circuit 28, and apply to the judging circuit 28, as an in-focus state judging reference value, either one of two constants Z1 and Z2 stored in the constant number storing circuit 42 according to the signal $d_{n-1}$ from the memory circuit 36 as described hereinbelow. The two constants Z1 and Z2 are in the relation Z1 < Z2, and in the case where the objective lens initially at the non-in-focus range is moved towards the in-focus range, the smaller constant Z1 is employed as the in-focus state judging reference value, and when the objective lens is judged to have entered the in-focus range corresponding to the constant Z1, the larger constant Z2 is prepared as the in-focus state judging reference value with respect to the defocus signal for the subsequent detecting cycle. More specifically, it is so arranged that, with the in-focus range being initially set to be narrow, focus adjustment is effected with respect to the narrow range as a target zone, and once the target zone has been reached, the in-focus range is expanded so as to eliminate the bewildering flickering of the display due to deviations of the defocus signals. The constants Z1 and Z2 may be experimentally set to proper values. It is to be noted that for applying the constant Z2 to the judging circuit 28, it may be arranged to add to the constant Z1, a difference $\Delta Z$ between the both or to subtract $\Delta Z$ from the constant Z2 when the constant Z1 is applied.

The constant number storing circuit 46 and the selecting circuit 48 constitute a second hysteresis circuit 49 for imparting a hysteresis characteristic to the judging circuit 50, which judges whether or not the contrast signal from the focus condition detecting portion 2 has reached the predetermined level. In general, when the contrast of the object to be photographed at its portion corresponding to the focus condition detecting region becomes low, reliability of the defocus signal tends to be lowered, and in the absence of the contrast, it becomes impossible to detect the defocus state. Accordingly, by preliminarily setting a judging level of the contrast, in the case where the contrast signal does not reach the judging level, it is regarded as impossible to detect the defocus state, and "11" indicating that the detection is impossible is produced from the judging circuit 28. In the similar manner as in the judging circuit 28 for the defocus, the hysteresis characteristic is imparted also to the judging circuit 50 for the contrast so as to stabilize the results of the judgements. The constants C1 and C2 stored in the constant number storing circuit 46 respectively represent the first and second contrast judging values with the constant C2 being set to be larger than the constant C1 by the predetermined value ΔC. These constants C1 and C2 are determined experimentally.

In the arrangement as described in the foregoing, the selecting circuits 40, 44 and 48 respectively select constants of the circuits at the previous stages according to the output $d_{n-1}$ of the memory circuit 36. More specifically, with respect to the defocus signal $x_n$ and contrast signal Cn of the latest detecting cycle, a constant to be selected by the judging result $d_{n-1}$ of the judging circuit 28 for the output of the detecting cycle at one cycle prior to this, is employed for executing predetermined functions at the calculating circuit 26 and the judging circuits 28 and 50.

Subsequently, the circuit including the constant number storing circuit 52, calculating circuit 54 and counter 56, constitutes a main portion of a detecting number limiting circuit for preventing the number of detecting functions per unit time from exceeding the predetermined number of times in the case where the objective lens is located at the in-focus position. The line sensor 4 effects the accumulation of electrical charge in an integrating time from 40 μ sec to 400 m sec or longer than this according to the intensities of incident light. Meanwhile, a predetermined data processing time, for example, of about 50 m sec is required from the completion of the integration to the display function by the output of the focus condition judgement result through a predetermined data processing. In the case where the integration time of the CCD is limited to 400 m sec at the longest, the period for one detecting cycle, i.e. the sum of the integrating time and the data processing time is approximately in the range of 50 m sec to 450 m sec. Accordingly, when the period for the detecting cycle is 50 m sec, detecting functions of twenty times per sec are effected. However, in the case where such detecting functions are effected for the in-focus state, since deviations exist in the respective defocus signals as described earlier, there may be cases where the in-focus display element L1 and the out-of-focus display element L2 or L3 are rapidly lit alternately, thus bewildering the photographer. Therefore, in the case of the in-focus state, the period for the detecting cycle is limited to the shortest, for example, to approximately 100 m sec for alleviation of the undesirable flickering of the display. For this purpose, in the case where the integrating time tn becomes shorter than a predetermined constant time t0, for example, of 50 m sec, the detecting cycle is delayed by a difference dt therebetween (dt=t0-tn) for starting a subsequent detecting cycle.

Still referring to the circuit diagram of FIG. 1, the constant number storing circuit 52 stores therein the data corresponding to the constant time t0. The calculating circuit 54 receives the signal for tn from the timer circuit 18 upon completion of the integration, and applies a signal Δtn as shown in Table 2 to the counter 56 according to the signal $d_{n-1}$ from the memory circuit 36.

TABLE 2

| $d_{n-1}$ | Δtn |
| --- | --- |
| 00 (In-focus) | 0 (tn≧t0) |
|  | t0 − tn (tn<0) |
| 01 |  |
| 10 (Out-of-focus) | 0 |
| 11 (Detection impossible) | 0 |

After the judging result $d_{n-1}$ of the judging circuit 28 is applied to the display circuit 32 and the memory circuit 36 for the respective display and memory functions, the counter 56 effects the time counting of the signal Δtn so as to produce a time counting completion signal after completion of the time counting. Here, in the case where the relation Δtn=0 is given to the counter 56, the system control circuit 58 arranged to immediately produce the time counting completion signal in response to the count starting signal, instructs the focusing condition detecting portion 2 to start a fresh number of detecting cycle in response to the time counting completion signal.

It is to be noted here that, during the out-of-focus state, if the number of detections is limited, the response speed from the out-of-focus display state to the in-focus display state is undesirably deteriorated, and therefore, the limitation in the number of detections as described above is not effected.

Subsequently, functionings of the circuit arrangement shown in FIG. 1 will be explained hereinbelow.

When the photographer depresses the detecting switch 60, the system control circuit 58 immediately initializes the output of the memory circuit 36 to "01", and instructs the focusing condition detecting portion 2 to start the integration of the CCD. Upon initialization of the memory circuit 36, the respective portions of the display stabilizing circuit 22 are set as in Table 3.

TABLE 3

|  | Initialization output |
| --- | --- |
| Output of selecting circuit 40 α | $\alpha_2 = 1$ |
| Output of selecting circuit 44 Z | Z1 |
| Output of selecting circuit 48 C | C1 |
| Output of calculating circuit 54 dt | 0 |
| Output of display circuit 32 | OFF |
| Output of judging circuit 50 | 0 |

Now, when the integration of the CCD is started and the time corresponding to the illuminance at the light receiving surface of the CCD has elapsed, the integrating function is stopped, and subsequently, the charge accumulated in each cell of the CCD is transferred and applied to the sample-hold circuit 8 as a voltage signal so as to be successively converted into digital values by the A-D converting circuit 10 for being stored in the memory circuit 12. Then, after the necessary calculating processing, the defocus signal (carrying information of direction of defocus) and contrast signal are produced from the calculating circuits 14 and 16. Meanwhile, the timer circuit 18 is reset at the starting of the integration of the CCD, and counts clock pulses during the integrating period so as to output the count value tn at the suspension of the integration. In the case where more than the predetermined time (e.g. 200 m sec) is required for the integration of the CCD, it is preferable to provide in the system control circuit 58, a function to instruct a forcible suspension of integration after a lapse of a predetermined time without waiting for the integration suspension instruction from the AGC described earlier so as to prevent a long time from being required for the integration when an object to be photographed is dark.

Incidentally, upon output of the defocus signal $x_1$ and contrast signal $Ct_1$ by the first detecting cycle, the calculating circuit 26 initialized to the relation α=1, outputs the signal $x_1$ as it is for the output $y_1$ to be applied to the judging circuit 28 and the memory circuit 30. On the other hand, at the judging circuit 50, the initialized contrast comparing reference value C1 and the contact signal $Ct_1$ are compared with each other, and the result of the comparison is applied to the judging circuit 28. In the case where the object to be photographed has a sufficient contrast at the relation $C1<Ct1$, the judging circuit 28 outputs the result $d_1$ of comparison between the focusing condition judging reference value $z1$ and the defocus signal $y_1 (=x_1)$ for application thereof to the display circuit 32 and the memory circuit 36. Now, on the assumption that a state of front focusing is detected as a result of the judgement, the display element L2 is illuminated, and the photographer rotates the focusing ring according to this display for moving the objective lens towards the in-focus position.

By the way, although the calculating circuit 54 applies its output $\Delta tn$ to the counter 56, owing to the initialization at the relation $\Delta tn=0$, in the first detecting cycle, the counter 56 immediately sends back the count completion signal in response to the count starting signal from the system control circuit 58. Thus, the focusing condition detecting portion 2 enters the second detecting cycle. Subsequently, the system control circuit 58 causes the memory circuits 30 and 36 to produce the memory contents thereof. More specifically, the output of the memory circuit 30 is represented by the relation $y_{n-1}=y_1 (=x_1)$, while that of the memory circuit 36 is denoted by the relation $d_{n-1}=d_1$. Accordingly, constants from the respective selecting circuits 40, 44 and 48 to be selected by the signal $d_{n-1}$ will be as shown in Table 4 below.

TABLE 4

| Output $d_{n-1}$ of memory circuit 30 | Output $\alpha$ of selecting circuit 40 | Output Z of selecting circuit 44 | Output C of selecting circuit 48 |
|---|---|---|---|
| 00 (In-focus) | $\alpha_1 = \frac{1}{2}$ | Z2 | C1 |
| 01 | | | |
| | $\alpha_2 = 1$ | Z1 (=Z2 − ΔZ) | C1 |
| 10 (Out-of-focus) | | | |
| 11 (Detection impossible) | ($\alpha_2 = 1$) | Z1 | C2 |

Thereafter, in the similar manner as in the first detecting cycle, the focusing condition detecting portion 2 feeds the integrating time data t2 to the calculating circuit 54 after completion of the CCD integration, and also, obtains the defocus amount $x_n$ for output to the calculating circuit 26. The calculating circuit 54 produces an output $\Delta tn (=\Delta t2)$ as shown in Table 2 according to the signal $d_{n-1} (=d_1)$.

On the other hand, the calculating circuit 26 carries out the calculation as shown in an equation (3) below, based on the equation (1).

$$y_2 = \alpha x_2 + (1-\alpha) y_1 \quad (3)$$

In the above case, if the first time is of the in-focus, the relation $\alpha=\frac{1}{2}$ is employed, and the average of the first and second defocus amounts is taken as the output $y_2$. Meanwhile, if the first case is of the out-of-focus, the relation $\alpha=1$ is adopted, and the second defocus amount $x_2$ is output as the output $y_2$ irrespective of the previous output $y_1$. The judging circuit 28 compares the signal $y_2$ with the output z of the selecting circuit 44 so as to output the judging result $d_2$ as shown in Table 1. In the above case, if the previous first result is of the in-focus, an in-focus zone slightly wider than $z1$ previously employed is set in the relation $z=z2$, while on the contrary, if the previous case is of the non-in-focus, an in-focus zone still narrower in the width is successively set. When the judging result $d_2$ is obtained, it is transmitted to the display circuit 32 so as to effect the display of the second detecting result, and is also transmitted to the memory circuit 36 to be stored therein. Subsequently, the time counting function for $\Delta t2$ is started at the counter 56, and upon emission of a time counting completion signal, the system control circuit 58 gives an instruction to start the third detecting cycle. With respect to the detecting cycle after the third detecting cycle, similar processing to the above second detecting cycle is repeated.

It should be noted here that the system control circuit 58 may be so arranged as to normally watch the state of the switch 60 and to automatically cut off the power source circuit, for example, fifteen seconds after opening of the switch 60 for completing the series of focusing condition detecting function.

The functions described so far may be summarized as follows.

In the case where the previous result of judgement is of the out-of-focus, only the present defocus amount $x_n$ is dealt with irrespective of the previous result for judgement as to whether or not it is within the in-focus zone set to be rather narrow so as to enter the subsequent detecting cycle. In the case where the previous judging result is of the in-focus state, the average thereof with the previous defocus equivalent amount $y_{n-1}$ is taken, and with respect to the result $y_n$, judgement is made as to whether or not it is within the in-focus zone set to be rather wide. In the above case, a limitation is set on the shortening of the period of the detecting cycle with respect to a comparative bright object to be photographed.

Incidentally, in the focusing condition detecting elements, when the defocus amount $x_n$ is obtained according to the predetermined algorithm, there are cases where a sufficiently reliable response can not be obtained depending on the output value of each cell of the CCD. For example, in the case where the object to be photographed is low in the contrast, with almost no difference between outputs of the respective cells of the CCD or where the charge accumulating amount of the CCD is too small due to an excessively dark object to be photographed, the focusing condition detecting elements are out of the detecting capacity thereof, and in such a case, a signal indicating that the detection is impossible, is produced from the judging circuit 28 in response to the output of the judging circuit 50, with consequent flickering of the display elements L2 and L3 for warnings.

In the above case, the hysteresis characteristic is imparted also to the judging circuit 50 for preventing the rapid changes between the normal display and warning display.

In connection with the above, in the case where the result $d_m$ of judgement at a mth time is not of "detection impossible" ($d_m \neq$ "11"), i.e. in the presence of a sufficient contrast, the judging level C1 rather low as a contrast judging reference value is applied to the contrast judging circuit 50 in the detecting cycle at a $(m+1)$th time for comparison with the contrast signal $Ct_{m+1}$ from the focusing condition detecting portion 2. On the other hand, in the case where the judging result $d_m$ at the mth time is of "detection impossible" ($d_m=$"11"), i.e. where the contrast is insufficient, with the display for warning, the judging level C2 rather high with respect to the contrast signal $Ct_{m+1}$ at the (m+1)th detecting cycle is applied to the judging circuit 50. FIG. 3 shows the hysteresis effect for the "detection impossible" judging level as explained above. By imparting the hysteresis effect to the judging circuit 50 in the manner as described so far, the undesirable unstability of the display in the vicinity of the warning display judging level may be advantageously reduced.

Figure 4:
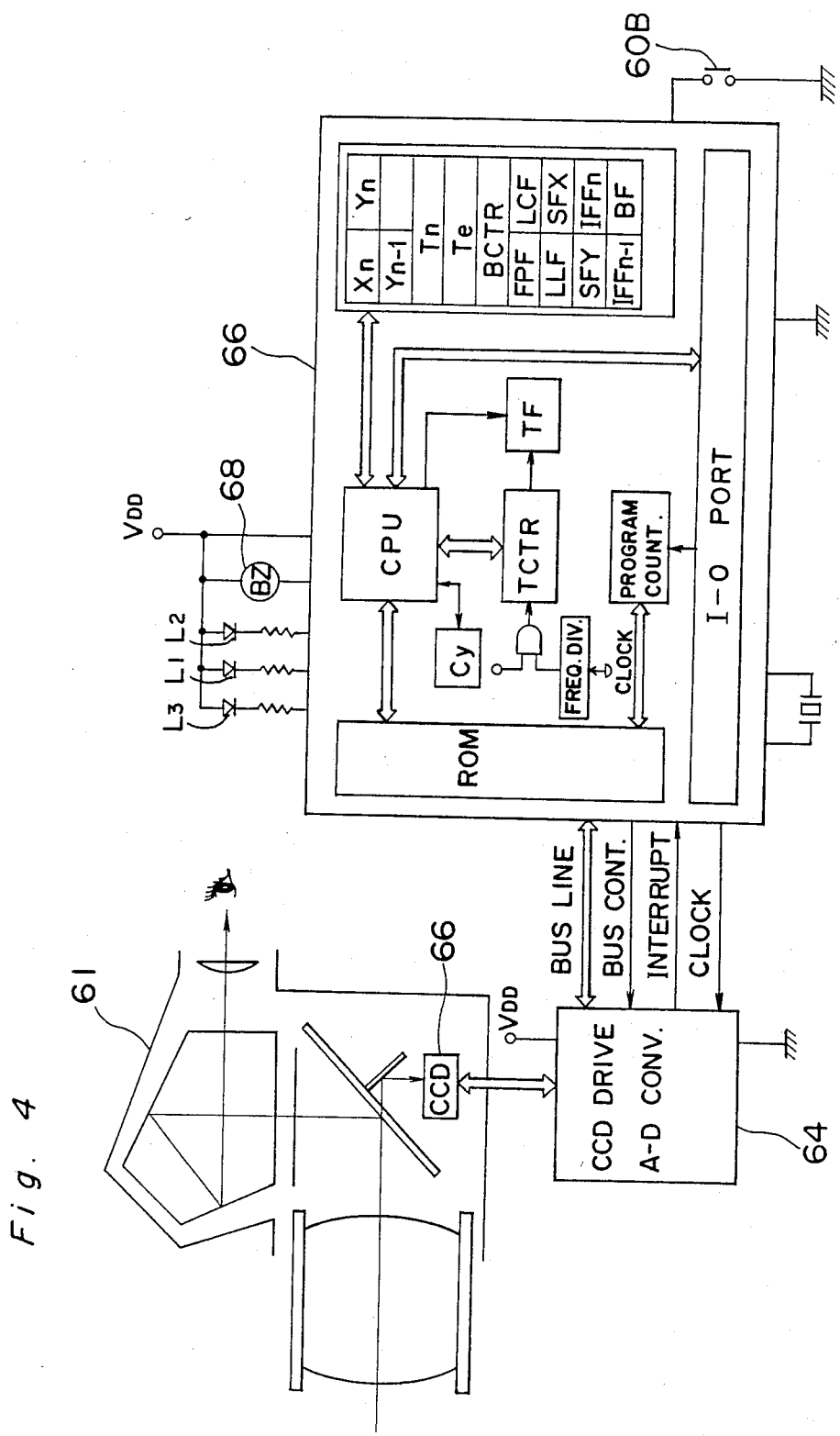
FIG. 4 is an electrical block diagram similar to FIG. 1, which particularly shows another embodiment thereof.

Reference is made to FIG. 4 showing a second embodiment of the present invention, in which the focusing condition display arrangement is constituted by a micro-computer (e.g. a model 80C48 manufactured by Intel, U.S.A.).

The arrangement of FIG. 4 generally includes a CCD block 62 provided at the bottom portion of a mirror box for a single lens reflex camera 61, a CCD control block 64 controlling the CCD and including an A-D converter for forming the output of the CCD into digital form, a micro-computer 66, and an AF switch 60B for instructing the focusing condition detection, a buzzer 68 for producing a sound only for a short period of time at the in-focus state and the light emitting diodes L1, L2 and L3 for displaying the focusing condition, which are connected to said micro-computer 66 as shown.

In the RAM (random access memory) area of the micro-computer 66, there are provided flags and counters as described hereinbelow.

The flag FPF is set to "1" at an early stage when the first detecting cycle is started, and is cleared from the second detecting cycle. The flag LCF is set to "1" when the contrast is judged to be lower than a predetermined level, and is cleared to "0" when the contrast is judged to be higher than the predetermined level. The flag LLF is set to "1" when the brightness of the object to be photographed is judged to be lower than the predetermined level. The flag SFX is set to "1" when the defocus signal for each detecting cycle shows the front focus, and is cleared to "0" when said defocus signal shows the rear focus. The flag SFYn is set to "1" when the defocus signal subjected to the weighted average processing shows the front focus, and is cleared to "0" when said defocus signal shows the rear focus. The flag IFFn is set to "1" when the latest defocus signal $y_n$ is judged to have entered the in-focus zone, and is cleared to "0" when said defocus signal $y_n$ is judged to be out of the in-focus zone. The flag IFFn-1 is to hold the previous focusing condition judging result, and is set to "1" when the previous judging result is of the in-focus state, and is cleared to "0" when said judging result is of the out-of-focus state. The flag BF is used in the process of control of the warning display function to be effected through flickering of the display light emitting diodes in the case where the focusing condition detection is judged to be impossible due to insufficient contrast.

The counter Tn-Te is employed to determine the longest time period for the integration of the CCD, and constituted by two bytes, i.e. one byte Tn of the high-order and one byte Te of the low-order. Upon starting of the integration by the CCD, the above counter starts the counting for subtraction from a preset value. The time required for counting the whole number of the set value is equivalent to the longest time for the integration. The counter BCTR is used as a timer for setting the energizing time and de-energizing time of the light emitting diodes L2 and L3 in the case where such diodes L2 and L3 are subjected to on/off control for the warning display, and a constant Ncn is set at the step of initialization. The timer counter TCTR is provided in the micro-computer as a counter, and is freely programmed for its time counting function through control of a gate provided at an input portion by a timer counter control instruction, with internal clock pulses of the micro-computer employed as an input signal. For the internal clock pulses, the fundamental machine cycle of the micro-computer subjected to frequency division may be employed. Moreover, when the count value of the timer counter TCTR is subjected to an overflow, the timer flag TF is automatically set to "1". This timer flag TF can be tested for its contents by the program, and the program may be subjected to a conditional branching by the test result. It is to be noted that, the timer flag TF, when tested by the program, is automatically cleared to "0" at that time point. The above timer flag TF may be employed for the control of the display function as described later.

Figure 5:
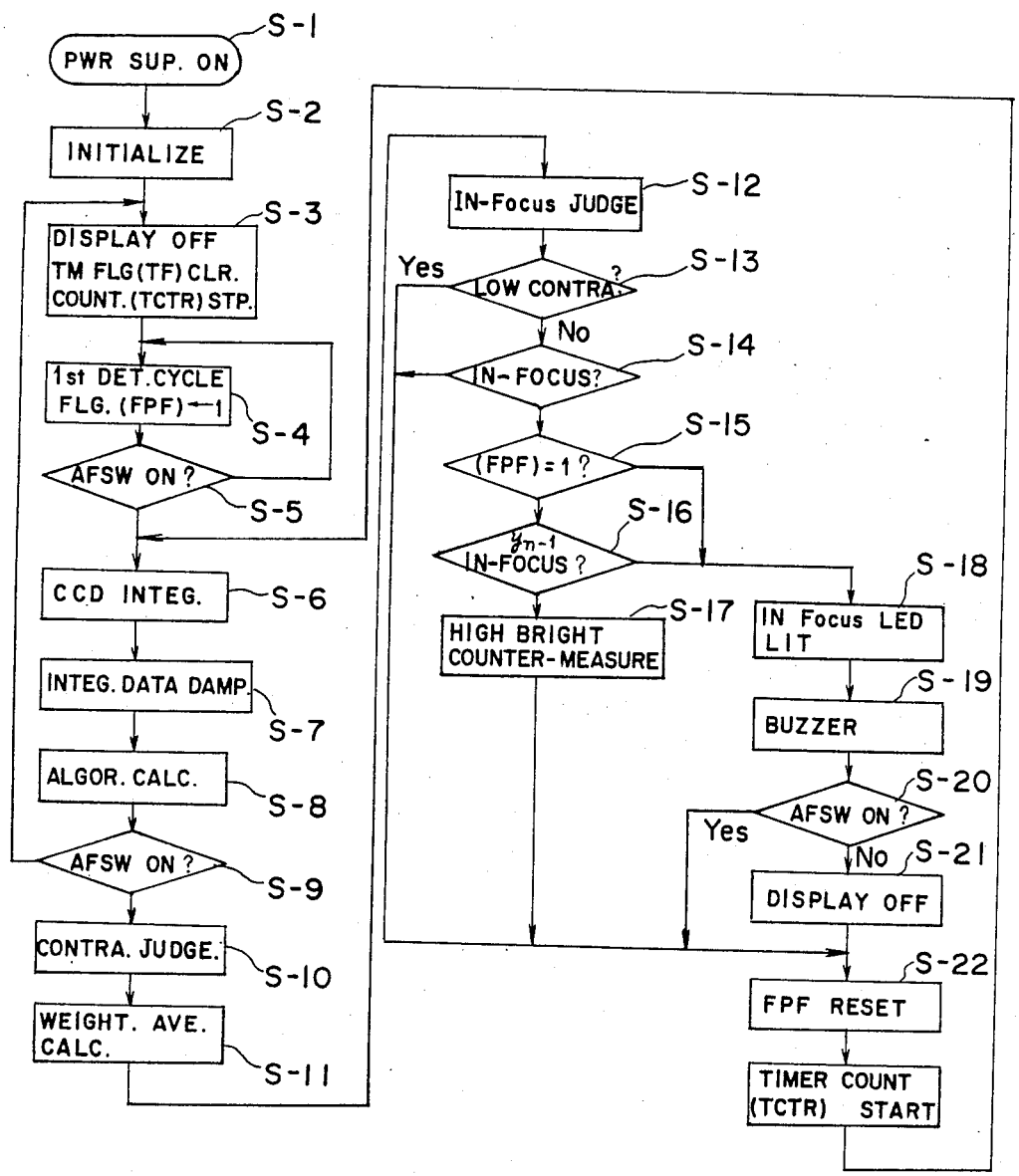
FIGS. 5 through 11 are flow-charts for explaining functionings of the above embodiment of the present invention.

Referring also to a flow-chart of FIG. 5 showing a flow of an overall functioning of the focus detecting system of FIG. 4, upon turning on of a power switch (not shown), initializing settings as follows are automatically effected at a step S-2 by the hardware of the micro-computer.

1. To set the program counter to "0".
2. To establish an external interruption inhibiting state.
3. To prevent input to the timer counter TCTR.
4. To clear the timer flag TF to "0".

Meanwhile, initializing settings as follows are also effected by the software thereof.

1. To start supply of clock pulses to the CCD control block 64.
2. To set initializing value Con to the counter BCTR.

Subsequently, at a step S-3, a procedure for illuminating none of the light emitting diodes L1, L2 and L3 for the focusing condition display is effected, while the timer flag TF is cleared to "0" for preventing the functioning of the sub-routine for display to be described later, and the input clock pulses to the timer counter TCTR are blocked. Subsequently, at a step S-4, "1" indicative of the first detecting cycle is set in the flag FPF. At a step S-5, checking is made as to whether or not the AF switch 60 is turned on, and if said switch is in the off state, the steps S-4 and S-5 are circulated for standing-by until the AF switch 60 is turned on. When the AF switch 60 is turned on, the instruction to start the integration of the CCD is output to the CCD control block 64 at a step S-6, and upon termination of the CCD integration, the integrating data are taken into the predetermined memory of the micro-computer at a step S-7, in response to the interruption requiring signal produced by the CCD control block 64. With respect to the detailed contents of the step S-6, in a step S-8 to be described later based on the flow-chart of FIG. 8, the output data of the CCD are processed for calculation by the predetermined algorithm so as to obtain the defocus amount including the direction and contrast.

It should be noted here that, since a period of time, for example, of 50 m sec is required for the above calculation processing, display sub-routines (FIG. 9) are inserted at several places in the course of the calculation processing routine, so that the on/off display for the warning to be described later may not become unnatural. At a step S-9, the AF switch 60 is again checked for the on or off state, and if it is in the off state, the step is reverted to the step S-3. Meanwhile, if the switch 60 is in the on state, the step is shifted to a step S-10 for comparison of the contrast obtained at the step S-8 with the predetermined value C.

Figure 6:
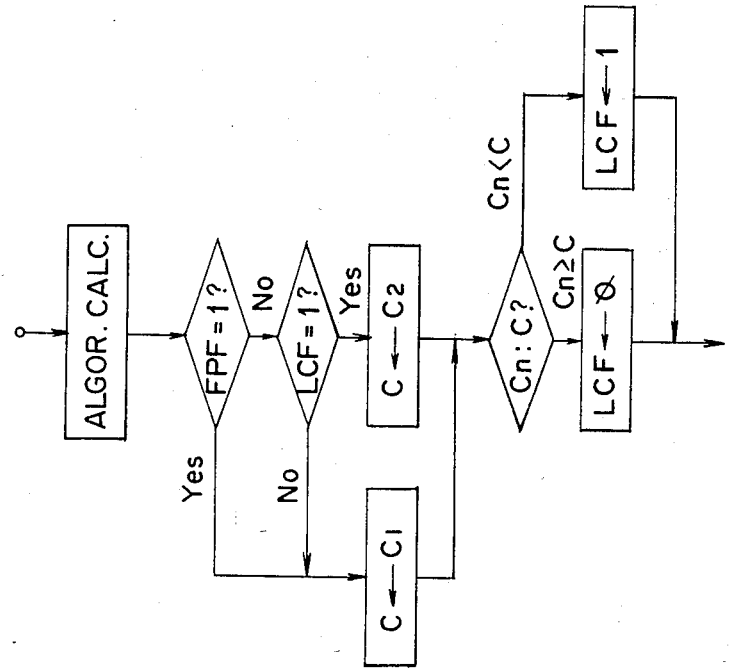

Referring to a flow-chart of FIG. 6 showing the contents of the step S-10, in the case of the first detecting cycle FPF=1, the relation C=C1 (<C2) is employed, and when this is exceeded, the low contrast flag LCF is resets to "0", and when this is not exceeded, the flag LCF is set to "1".

From the second detection, either one of the value C1 or C2 is selected for use as the reference value C as described earlier based on the comparative result of the first detecting cycle, and upon judgement that the contrast is sufficient, with the low contrast flag LCF which shows the previous result being "0", the value C1 is employed, while on the contrary, if the contrast is judged to be insufficient, with "1" being set, the value C2 is adopted. The result of comparison with respect to the reference value thus selected is set in the low contrast flag LCF, and in this case, the previous contents are lost.

Figure 7:
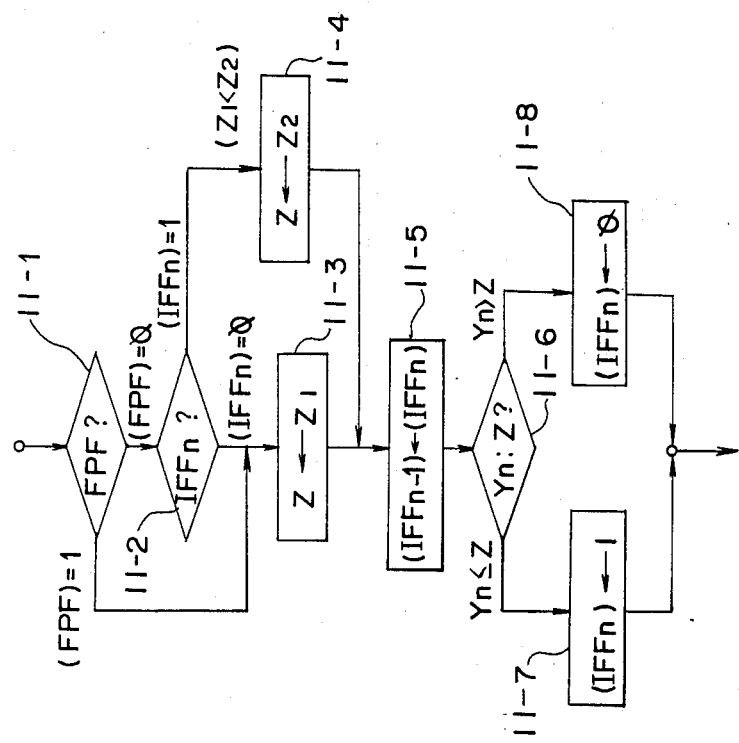

Subsequently, in a step S-11, the calculation for obtaining the weighted average $y_n$ of the latest defocus amount $x_n$ and the past defocus amount $y_{n-1}$ is carried out. At a subsequent step S-12, judgement is made as to whether or not the defocus amount $y_n$ calculated at the step S-11 is within the predetermined in-focus zone. FIG. 7 is a flow-chart showing the contents of the above step. At a step 11-1 in FIG. 7, checking is made as to whether or not the flow in question is of the first detecting cycle by studying the flag FPF. If said flow is of the first detecting cycle, the step is shifted to a step 11-3, and the narrower value Z1 is prepared as an in-focus judging value Z. At the second detecting cycle or thereafter, the flow is shifted to a step 11-2 for checking of the previous focusing condition judging result from the in-focus flag IFFn. With respect to the previous focusing condition judging result, in the case of the in-focus at the step 11-7 or 11-8, "1" is set, while in the case of the out-of-focus, the flag IFFn is cleared to "0". Incidentally, as a result of the check of the in-focus flag IFFn, in the case of the out-of-focus, the step is shifted to the step 11-3, while, in the case of the in-focus, the step is transferred to a step 11-4.

When the step is shifted to the step 11-4, the wide value Z2 is prepared as the in-focus judging value Z. At a step 11-5, the contents of the in-focus flag IFFn are set in another in-focus flag $IFF_{n-1}$. The above step is not related to the focusing condition judging function for the time being, and the set information is used at a later step S-16. Subsequently, at a step 11-6, judgement is made as to whether or not the defocus amount Yn is in the prepared focusing condition judging value Z. In the case of the in-focus, the step is shifted to the step 11-7, and "1" is set at the in-focus flag IFFn, while in the case of the out-of-focus, the step is shifted to the step 11-8, and the in-focus flag IFFn is cleared to "0". In the manner as described above, the judging value Z for the present focusing condition detection is selected based on the previous focusing condition detection result for imparting the hysteresis characteristics.

Subsequently, at a step S-13, the contents set in the low contrast flag LCF at the step S-10 are checked, and if they are not of the low contrast, the step is shifted to a subsequent step S-14. At the step S-14, the contents of the in-focus flag $IFF_n$ are checked, and in the case of the in-focus flag, the step is shifted to a subsequent step S-15. At the step S-15, it is checked whether or not the flow in question is of the first detecting cycle by checking the flag FPF. In the case of the first checking cycle, the step is shifted to a step S-18 to illuminate the light emitting diode for the in-focus display. If the finding is not of the first detecting cycle, the step is shifted to a step S-16, and the result of the previous focusing condition detection is investigated by checking the in-focus flag $IFF_{n-1}$. If the finding is of the out-of-focus, the step is shifted to a step S-18. In other words, in the case where the previous result is of the out-of-focus, with the present result being in the in-focus, the in-focus display is given at the step S-18. When the present time is also of the in-focus subsequent to the previous time, the step is shifted to the step S-17, and in the case of high brightness, the period for the detecting cycle is extended.

Incidentally, subsequent to the step S-18, at a step S-19, simultaneously with the illumination of the light emitting diode L1 for the in-focus display, a buzzer is sound for a short period of time (for example, about 0.1 second) for an acoustic indication of entrance into the in-focus zone. In a subsequent step S-20, it is checked whether or not the AF switch 60 is turned on. If it is turned on, the step is shifted to a step S-22, while, if it is not turned on, the step is transferred to a step S-21. At the step S-21, the illuminated light emitting diode is de-energized. At the step S-22, the flag FPF is cleared to "0". Subsequently to the above step, the flow is shifted to the step S-6.

Figure 8:
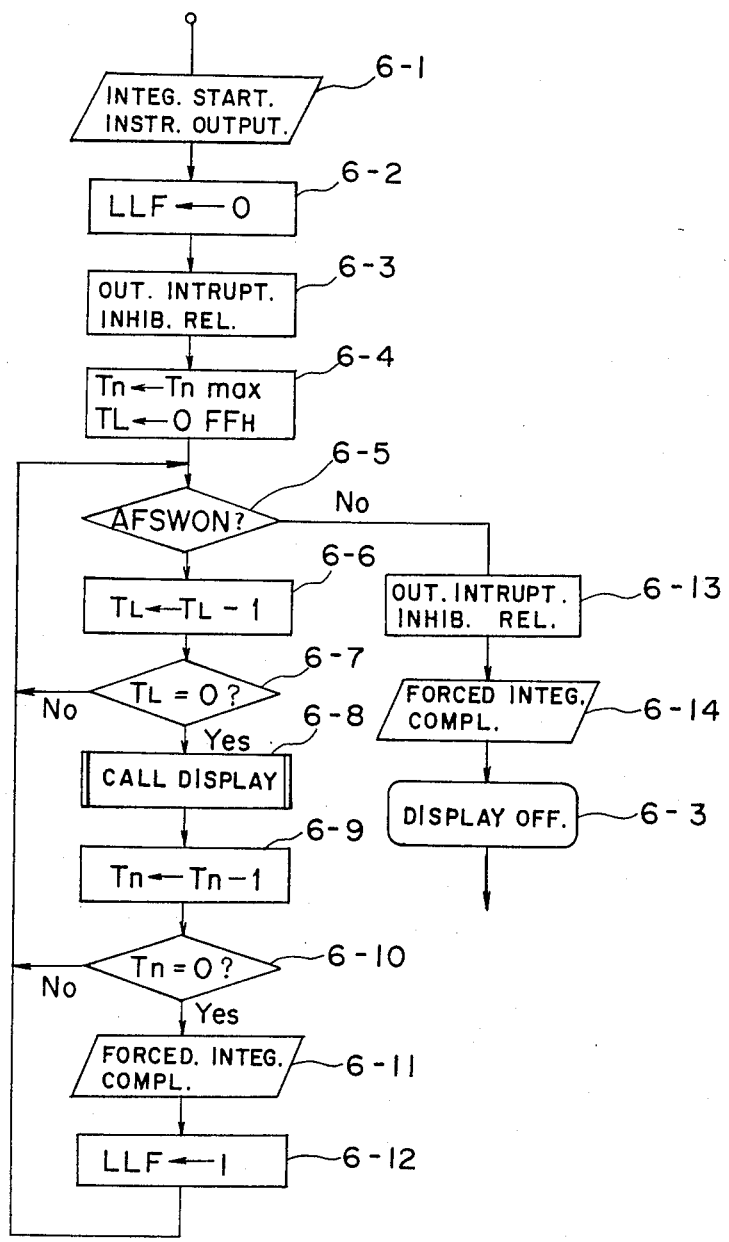

Hereinbelow, a flow-chart of FIG. 8 showing the contents of the CCD integrating step S-6 will be explained.

At a step 6-1, a signal instructing starting of the integration is produced, and subsequently, at a step 6-2, a low luminance flag LLF is cleared to "0". At a step 6-3, the micro-computer is set to the state capable of accepting interruption, and the step is shifted to a next step 6-4. At the step 6-4, the pulse count value corresponding to the longest integrating time 400 m sec is set in the counter Tn-Te, which is constituted by two bytes of the high order Tn and low order Te. Initially, the count value Tn max corresponding to the longest integrating time is set in the counter Tn, while FF (=256) is set in the counter Te. At a step 6-5, it is checked whether or not the AF switch 60 is turned on. If it is in the on state, the contents of the counter are subjected to subtraction thereafter, but when the CCD integration is terminated before completion of the counting, i.e. before the contents of the counter become zero and an interrupting pulse indicating the above state is produced from a CCD control block 64, the subtracting function for the counter is suspended for transfer into the interruption processing routine. In the case where the interruption does not occur, the integration of the CCD is forcibly terminated upon completion of counting of 400 m sec, and the low luminance flag LLF is set to "1" for shifting to a subsequent step. The flow from a step 6-6 to a step 6-10 relates to that of subtraction count of the counter. At the step 6-6, one count is subtracted from the contents of the low order counter Te, and at the step 6-7, it is checked whether or not the contents of the counter Te have become zero. If the contents are not zero, the step is reverted to the step 6-5. In the manner as described above, the flow is circulated between the steps 6-5 and 6-7 until the contents of the counter Te become zero. When the counter Te becomes zero, the step is shifted to a step 6-8 described later, and subsequently, one is subtracted from the contents of the high order counter Tn at a step 6-9. At a step 6-10, it is checked whether or not the contents of the counter Tn have become zero, and if the contents are not zero, the step is reverted to the step 6-5. Thus, unless any interruption takes place, the flow is circulated between the steps 6-5 and 6-10 until the contents of the counters Te and Tn become zero, and the time required for such circulation is approximately 400 m sec. At a step 6-11, the integration of the CCD is forcibly terminated, and then, at a step 6-12, the low brightness flag LLC is set to "1", which means that the brightness of the object to be photographed is low. Anyhow, upon termination of the integration, the interruption takes place, and the microcomputer 66 enters the step S-7 for the interruption processing for effecting taking-in of the integration data. However, at the step 6-5, if it is detected that the AF switch 60 is in the off state, the micro-computer 66 is brought into the interruption inhibit state to stop the integration of the CCD, and the step is reverted to the step S-3.

Figure 9:
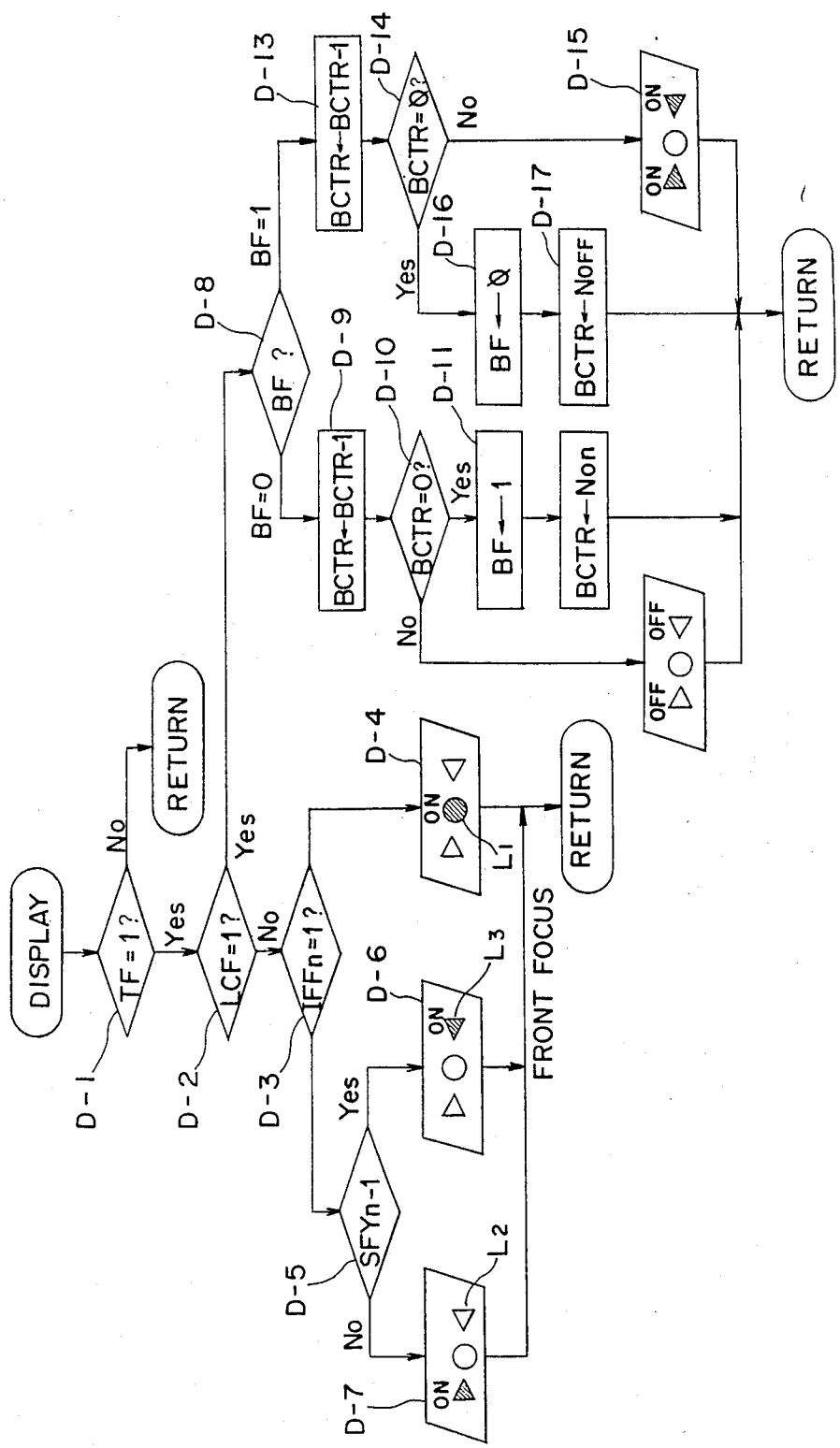

A step 6-8 is a sub-routine for the display functions, and a flow-chart thereof is shown in FIG. 9.

In FIG. 9, at a step D-1, it is checked whether or not "1" is set in the time flag TF, and in the case of "0", returning is effected. In other words, the sub-routine for the display functions is utilized only when the timer flag TF is set to "1". After the checking, the timer flag TF is automatically cleared to "0". At a step D-2, a low contrast flag LCF is checked, and if it is not of low luminance, the step is shifted to a step D-3 which is a routine for dispalying the focusing condition. At the step D-3, an in-focus flag INFn in which the latest focus condition detecting result is set, is checked, and in the case of the in-focus state, the step is transferred to a step D-4 for illuminating the light emitting diode L1. Meanwhile, in the case of the out-of-focus state, a sign flag SFYn for indicating the direction of the out-of-focus is checked at a step D-5, and the light emitting diode L2 or L3 is illuminated according to the state of front focus or rear focus.

In the case of a low contrast, the flow is shifted to a step D-8 which is a routine for warning display, and a flickering flag BF is checked. In the case where this flag is "1", one is subtracted from the contents of the counter BCTR at a step D-13, and subsequently, at step D-14, it is checked whether or not the contents of the counter BCTR have become zero. Since the counter BCTR is set with a constant Non at the initializing step S-2, the flow continuously passes through the step D-13 by Non times so far as the state of the low contrast continues.

During the above period, at a step D-15, the light emitting diodes L2 and L3 are simultaneously lit. At the step D-13, upon detection that the counter BCTR has become zero, the flow proceeds to steps D-16 and D-17, and the flag BF is cleared, with a constant Noff being set in the counter BCTR. In the above case, the constant Noff defines the period for keeping the light emitting diodes L2 and L3 turned off, and is set to a value, for example, three times the constant Non. In other words, the light emitting diodes L2 and L3 are set to be 1:3 in a ratio of the on period to the off period during the warning, although the ratio need not necessarily be limited to the above. Incidentally, in the state where the flag BF is cleared to "0", the flow is led towards the step D-9. As far as the state of a low contrast continues, the flow passes through the step D-9 continuously by the constant Noff times. During the above period, the light emitting diodes L2 and L3 are in the off state. At the step D-10, upon detection that the counter BCTR has become zero, the constant Non is set in the counter BCTR at a step D-12. Accordingly, in the next step D-8, the flow is led towards the step D-13. In the manner as described above, the light emitting diodes L2 and L3 are subjected to the flickering and lighting control for the warning display. It is to be noted here that, although the flickering flag BF may be arranged to be set at the initializing step S-2, there is no inconvenience, even if it is in any of the set or clear state initially.

Subsequently, functions of the sub-routine for display will be explained based on the foregoing description of the display sub-routine and the overall flow chart of FIG. 5.

At the step S-3, the timer counter TCTR is in the stopped state and the timer flag TF is initialized to "0", with the light emitting diodes for display being also turned off, and therefore, at the first detecting cycle, even when the flow jumps to the display sub-routine, since TF="0" at the step D-1 in FIG. 9, no display function is effected due to the immediate returning without fail, and thus, the light emitting diodes remain in the off state. At the time point where the first detecting cycle has been completed, clock input to the timer counter TCTR is allowed at the step S-22 in FIG. 5, and therefore, in the detecting cycles after the second time, the timer counter TCTR generates overflow pulses at each predetermined time, and the timer flag TF is set to "1". Thus, in the case where the relation is TF="1" upon jumping to the display sub-routine, the display of the focusing condition or warning display as described earlier is effected for subsequent returning. It is to be noted that, when the display function is effected at the relation TF="1", since the timer flag TF is cleared to "0", no display function is effected even when the flow jumps to the display sub-routine until the timer flag TF is set to "1" by the generation of the subsequent overflow pulse.

Figure 10:
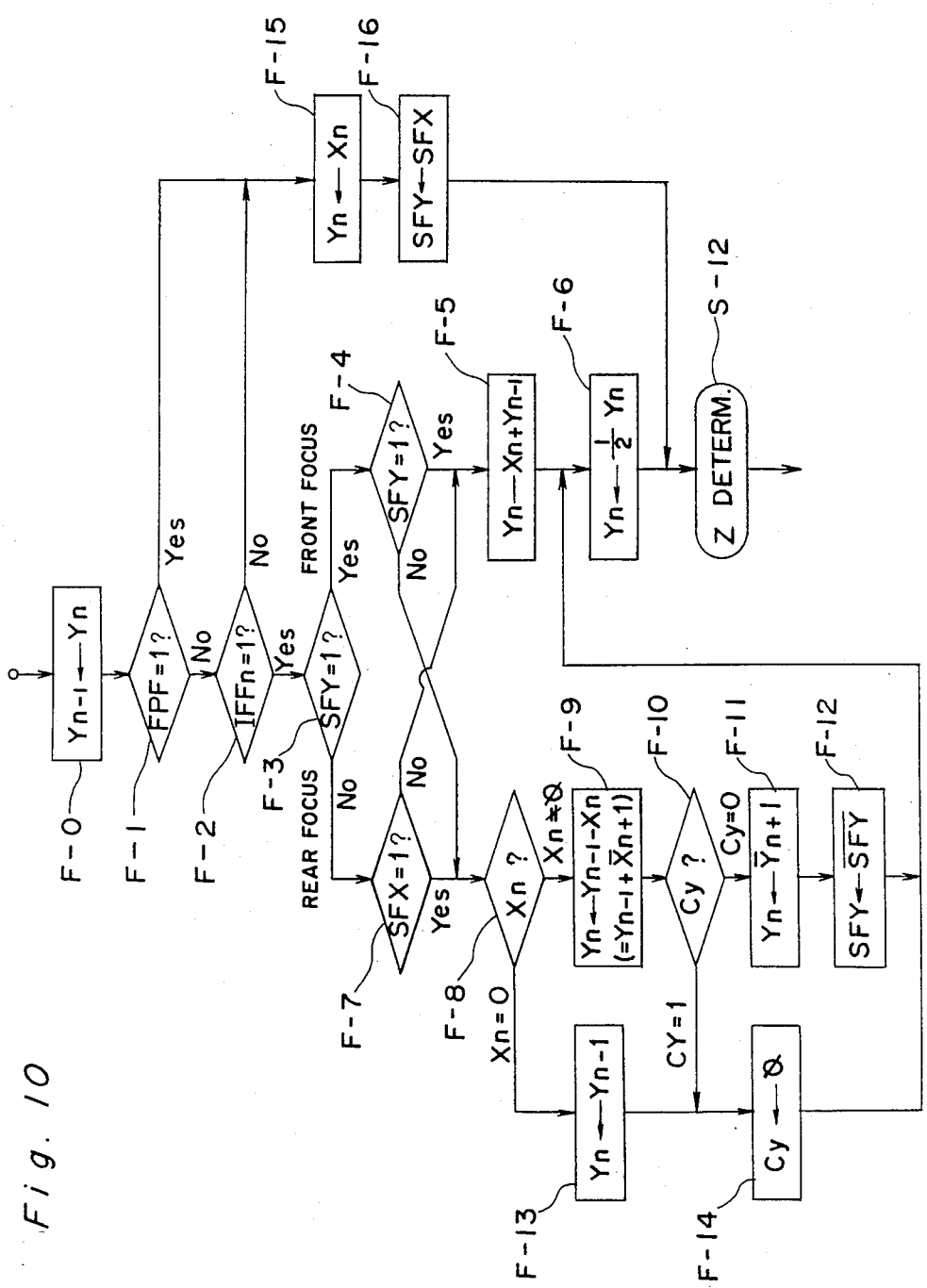

Reference is also made to a flow-chart in FIG. 10 showing the contents of the step S-11 for the weighted average calculation in FIG. 5.

At a step F-0 in FIG. 10, in preparation of the processing after a step F-1, the value possessed by the memory $y_n$ at that time point is transferred to the memory $y_{n-1}$ as an average value at the previous time. At the step F-1, the flag FPF is checked, and in the case where "1" indicating the first detecting cycle has been set, the flow is transferred to a step F2 for checking the flag IFFn. At the above time point, the flag IFFn still holds the previous result of focusing condition detection. In the case where the previous focusing condition judging result is of the out-of-focus, the flow jumps to a step F-15, while, if the result is of the in-focus, the step is shifted to a step F-3. In this step F-3, the sign for the defocus amount $y_{n-1}$ subjected to the previous focusing condition detection, i.e. whether the amount is for a front focus side or a rear focus side, is checked at the flag SFY. At this time point, the contents of the flag SFY also hold the previous result of judgement in the similar manner as in the flag IFFn. It is to be noted here that the defocus signal still has a polarity indicating the front focus or rear focus even if it is within the in-focus zone. At the step F-3, in the case where the flag SFY="1", i.e. the state is of the front focus side, the flow is shifted to a step F-4, and the sign of the defocus signal $x_n$ based on the present detecting cycle is checked by the flag SFX, and in the case where SFX="1", i.e. the state is of the front focus, the flow is transferred to a step F-5, and, when SFX="0", i.e. the state is of the rear focus, the flow is shifted to a step F-8. On the contrary, in the case where SFY="0", i.e. the state is of the rear focus in the step F-3, the flow is transferred to a step F-7, and in the similar manner as in the step F-4, the sign of the defocus amount $x_n$ based on the present detecting cycle is checked by the flag SFX. In the case where SFX="1", i.e. the state is of the front focus, the flow is transferred to the step F-8, while in the case of SFX="0", i.e. the rear focus, the flow is shifted to the step F-5. More specifically, in the processings of the respective steps F-3, F-4 and F-7, it is checked whether or not the defocus direction is changed by referring to the previous defocus direction SFY and the present defocus direction SFX, and in the case where the defocus direction is not changed, the flow is transferred to the step F-5, while if the defocus direction is changed, the step is shifted to the step F-8. In the case where the defocus direction has not been changed, at the step F-5, the average value $y_{n-1}$ up to the previous time and the absolute value $y_{n-1}$ of the present value $x_n$ is added to each other by directing attention only to $x_n$, and the total value thereof is divided by 2 at the step F-6 to obtain a fresh average value $y_n$. In the above case, rewriting of the flag SFY is not required, since there is no change in the defocus direction. In the case where the previous defocus direction differs from the present defocus direction, an averaging processing is effected after the step F-8 up to the step F-6 by taking the sign into consideration. In the first place, at the step F-8, it is checked whether or not $x_n$ is equal to 0, and if equal, the step is shifted to a step F-13, and the previous average value $y_{n-1}$ is set as the total value $y_n$ for the previous time and the present time. Subsequently, at a step F-14, a carry flag Cy is cleared to "0", and then, at the step F-6, the present average value $y_n$ is obtained through division by two. In the above case also, since there is no change of the previous and present average values $y_{n-1}$ and $y_n$ in the defocus direction, it is not necessary to rewrite the flag SFY. At the step F-8, in the case where $x_n \neq 0$, the absolute value $x_n$ ($= |x_n|$) of the present defocus amount is subtracted from the absolute value $y_{n-1}$ ($= |y_{n-1}|$) of the average value of the previous defocus at the step F-9, and the result thereof is represented by $y_n$ for judgement of smallness or largeness of $y_{n-1}$ and $x_n$ depending on the carry flag Cy at the subsequent step F-10. This processing is required due to the fact that, since the direction for the focusing condition adjustment is altered between the previous time and the present time, the average value can not be obtained by the addition only of the defocus size in the previous time and the present time.

It is to be noted that the subtraction is actually effected through an addition by taking a complement of the number to be subtracted. As a result of the addition, in the case where the carry flag Cy is set by the carry, the result of addition is employed as it is for the result of subtraction. In this case, the flow is transferred to a step F-6 through a step F-14. In the case where the carry flag Cy is cleared, the complement as the result of the addition is equivalent to the result of the subtraction. However, since the sign is inverted only in the above case, the previous contents of the sign flag SFY are inverted at the step F-12. Subsequently, the flow is transferred to the step F-6 so as to obtain the average value. In the manner as described above, in the case where the last judging result is of the in-focus, the defocus amount $x_n$ by the present detecting cycle is imparted with a weight of ½, and the average value with respect to the past defocus amount is obtained. As a result of the above processing, the weighted average $y_n$ represented by the equation (2) and SFY are obtained so as to be utilized for the focusing condition judgement at the step S-12. On the other hand, in the case where the result of the first detecting cycle or the previous judging result is of the out-of-focus, at the steps F-15 and F-16, the present measured value $x_n$, i.e. the absolute value $x_n$ and defocus direction SFX are respectively transferred into the memory $y_n$ and the flag SFX as the present processing $y_n$ so as to be utilized for the focusing condition judgement at the step S-12.

When the foregoing description is summarized, the arrangement of the present invention is such that in the case where the first detecting cycle or the last judging result is of the out-of-focus, the present measured value is adopted as it is without effecting the weighted averaging for utilization in the focusing condition judgement, while on the other hand, if the previous judging result is of the in-focus, the averaging processing is effected between the previous averaging processed value $y_{n-1}$ and the present measured value $x_n$ by taking the signs into consideration. Owing to the processing as described above, since the averaging is not effected under the out-of-focus state, the latest measured data may be displayed every moment without being affected by the past data, and therefore, the time delay in the transfer of display from the out-of-focus state to the in-focus state may be minimized, while, in the in-focus state, the unstability of the display due to deviation in the measured value for each time can be improved. Moreover, if the above averaging is repeated, the weight of the past measured value $y_{n-i}$ (where i is an integer) with respect to the latest average value $y_n$ is reduced in proportion to $2^{-i}$, and thus, the so-called weighted average processing is effected. It is to be noted that the above weighted average processing becomes particularly effective in the case where an object to be photographed moves or where the positional relation between the camera and the object to be photographed tends to vary due to shaking of the camera held by the hand, etc.

Figure 11:
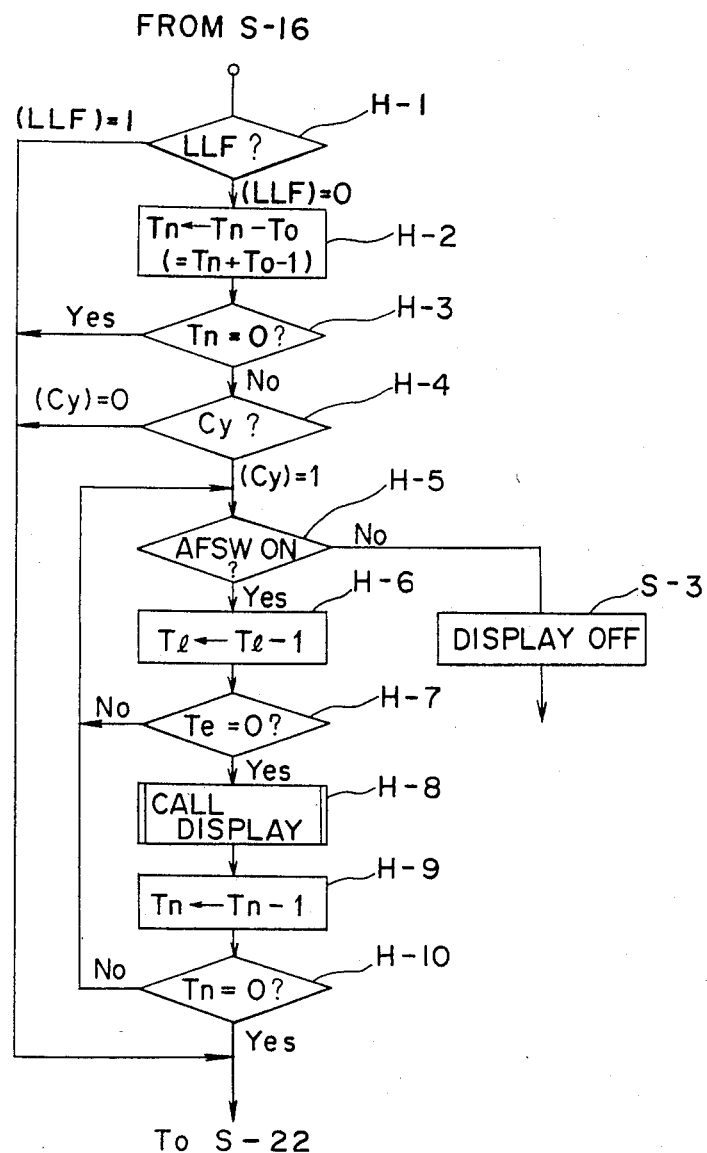

In FIG. 11, there is shown a flow-chart illustrating a routine for suppressing the undesirable flickering of the display during the period of a high brightness by the step S-17 in FIG. 5.

As described earlier, in the case, where the object to be photographed is of a high brightness, the integrating time of the CCD becomes short at less than several tens m sec, with the number of detecting cycles per unit time being increased. Accordingly, the number of display functions per unit time is also increased, and thus, the flickering of the display tends to be offensive to the eye. Therefore, in the case where the integrating time tn of the CCD becomes shorter than a predetermined time t0 (=50 m sec), a "wait time Δt" is provided so as to limit the increase of the number of detecting cycles per unit time through prolongation of the time for the detecting cycle by the wait time for suppressing the flickering of the display.

In FIG. 11, at a step H-1, a low luminance flag LLF is checked, and in the case where the object to be photographed has a low luminance, with the flag LLF being set to "1", the flow jumps to the step S-22. Meanwhile, if the flag LLF is cleared to "0", the step is shifted to a step H-2 to effect processing for the suppression of flickering. It is to be noted here that the information for the integrating time of the CCD has been obtained by the integrating routine of FIG. 8.

In FIG. 8, during the integration of the CCD, the counter Tn is subjected to the subtraction counting, and upon completion of the integration of the CCD in the course, the flow jumps to the interrupting routine in response to the interruption request signal from the CCD block 64, and the subtraction counting of the counter Tn is suspended. Accordingly, in the counter Tn, there remains the value Tn obtained by subtracting the count value during the integration from the initial value Tn max. Here, by referring to a graph of FIG. 12, the integrating time t0 in which the wait time becomes just zero is considered, and the remainder in the counter Tn equivalent to the integrating time t0 is represented by T0.

With respect to the value for t0, the operability of the camera is considered, and the shortest value of the detecting cycle is determined by taking into account, the degree of suppression of flickering of the display and the response of the display, and the value t0 is obtained by subtracting the calculation time from the above value. At step H-2, the value T0 corresponding to the above value t0 is subtracted from the count value remainder Tn stored in the counter Tn, and as a result, $\Delta T$ is newly stored in the counter Tn. At step H-3, it is checked whether or not the result of the subtraction is zero, and in the case of zero, the flow is transferred to the step S-22, and if the result is not zero, at a subsequent step H-4, the carry flag Cy produced as a result of the subtraction (i.e. the addition of the complement) at the step H-2 is checked. In the case where the result of calculation at the step H-2 is negative $\Delta T < 0$, i.e. Cy=0, this means that no wait time is required, and the flow jumps to step S-22. In the case where the relation is Cy=1, i.e. where the result of subtraction at the step H-2 is positive $\Delta T < 0$, it means that the detecting time cycle is too short, and with a loop starting from the step H-5 and returning to the step H-5 through the step H-10 being set as one period, the elapse of time is waited, while the state of the AF switch 60 is being checked for a time period equivalent to the count value $\Delta T$ newly stored in the counter Tn at the step H-2, i.e. for the period $\Delta T$, and also while the display control is being effected.

At the step H-5, the state of AF switch 60 is checked, and if it is in the off state, the flow is shifted to the step S-3. Meanwhile, in the case where the switch 60 is in the on state, the flow is shifted to the step H-6 and one is subtracted from the counter Te. Subsequently, the flow is transferred to the step H-7 to see whether or not the contents of the counter Te have become zero. If the contents are not zero, the flow reverts to the step H-5, and circulates between the steps H-5 and H-7 until the relation becomes Te=0, at which the flow is shifted to the step H-8. The step H-8 is a sub-routine for display shown in FIG. 9. Upon transfer to the step H-9 subsequent to the step H-8, one is subtracted from the contents Tn of the counter Tn, and at the step H-10, it is checked whether or not the relation is Tn=0. In the case where the relation is Tn≠0, the flow returns to the step H-5. Thus, the flow circulates between the steps H-5 and H-10 including the circulation between the steps H-5 and H-10 as described earlier, until the relation becomes Tn=0. At the step H-10, if the relation becomes Tn=0, the flow is transferred to the step S-22. In the manner as described above, in the routine of FIG. 11, the count value $\Delta T$ corresponding to the wait time is obtained, and the time required for the subtraction is applied to the wait time until said count value becomes zero.

For better understanding of the point as described above, examples of conventional focusing condition detecting arrangements will be explained hereinbelow with reference to FIG. 13(A) to FIG. 17, in which FIGS. 13(A) and 13(B) show optical constructions at light receiving portions of the known focusing condition detecting arrangements.

The arrangement of FIG. 13(A) includes an objective lens O1, a large number of small lenses f1, f2, ... and fn disposed at a position equivalent to a film plane with respect to the objective lens O1, and corresponding number of photodiode cell elements ai and bi (where i=1, 2, ... and n) provided in pair behind the respective lenses f1, f2, ... and fn. A light ray represented by a symbol S1 and passing through the lower portion of the lens O1 in FIG. 13(A) is incidence upon the group of the elements a1, a2, ... and an, while a light ray denoted by a symbol S2 and passing through the upper portion of the lens O1 is incident upon the group of the elements b1, b2, ... and bn. During the in-focus state the elements ai and bi receive the light rays from the same point of the object to be photographed, whereas, during the out-of-focus state or non-in-focus state, the light rays from the same point of the object to be photographed are not incident upon the elements ai and bi in pair, but deviated according to the direction and degree of the out-of-focus state, and thus, by detecting the direction and magnitude of the above deviation, a defocus amount including the direction may be obtained.

In FIG. 13(B), another known focusing condition detecting arrangement includes the objective lens O1, a condenser lens O2 disposed at a position, equivalent to or close to the film plane with respect to the objective lens O1, image forming lenses O3 and O4 disposed behind the condenser lens O2 in a symmetrical relation with respect to an optical axis O, and the groups of the photodiode cell elements a1, a2, ... and an, and b1, b2, ... and bn respectively disposed at image forming planes of the lenses O3 and O4 as shown.

Figure 14:
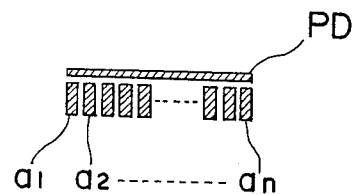
FIG. 14 is a fragmentary side sectional view showing, on an enlarged scale, detailed construction of a light receiving portion of the CCD.

Referring also to FIG. 14 showing, on an enlarged scale, one example of the construction at the light receiving portion of the cell elements, there is disposed a photodiode PD in the vicinity of the group of the elements a1, a2, ... and an, apart from said element group so as to receive light which may be regarded as reflecting an intensity of light incident upon the entire element group. The photodiode PD is used for monitoring the integrating time by the cell elements.

Figure 15:
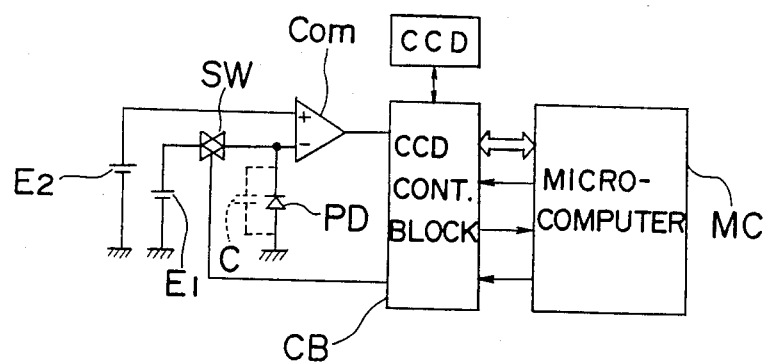
FIG. 15 is an electrical block diagram of a CCd integrating time monitor circuit.

FIG. 15 shows one example of an integrating time monitoring circuit employing the photodiode PD referred to above and coupled, through a comparator Com and an analog switch SW, to a CCD control block to which the cell elements and a microcomputer MC are connected. For the integration of the cell elements, a constant voltage E1 is first charged into a capacity component C of the photodiode PD through the analog switch SW, and the switch SW is rendered non-conductive simultaneously with the starting of the integration of the cell elements. From this time point, the electrical charge of the capacity component C is discharged by the photo current of the photodiode PD proportional to the intensity of the incident light, with a voltage level at the cathode of the photodiode PD being gradually lowered. When the above voltage level has been lowered to a predetermined voltage E2, an output level of the comparator Com is inverted from a "low" level to a "high" level. The time from the cutting off of the switch SW to the arrival of the output of the comparator Com at the "high" level is utilized as the integrating time of the cell elements. The timing for bringing the switch SW into the cut off state, i.e. the timing for starting the integration is designated by the program of the microcomputer MC, with the control signal therefor being given through the CCD control block CB. Upon emission of the timing for starting the integration, the microcomputer MC starts the time counting function based on software by an internal counter, and is also brought into a state in which it is released from the prohibition against an external interruption. When the comparator Com produces a "high" voltage signal, the CCD control block CB applies an interruption request signal to the microcomputer MC by responding to the "high" voltage signal, and in response to the above function, the program of the microcomputer MC jumps to an interruption routine, with simultaneous stopping of the counting function of the counter referred to above. Thus, information related to the integrated time of the cell elements is secured in the counter. With the employment of the integrated time thus secured, if such a time becomes longer than a time corresponding to a predetermined low brightness level, it may be judged that the object to be photographed is at a low brightness so that the detection of the focusing condition is impossible. Meanwhile, in the case where the integrated time secured in the manner as described above becomes shorter than a time corresponding to a predetermined high brightness level, the information of the integrated time is utilized as information for suppressing a flickering of the display as described later. Upon shifting to the interruption routine, the microcomputer MC stores the CCD integration data in a predetermined region of an RAM (random access memory), and the CCD integration data thus stored are successively applied to the CCD control block CB in time series by the analog voltage in synchronization with transfer clock from the cell elements. In the CCD control block CB, the analog voltage signal from the CCD elements is successively converted into the digital values, and the digital values thus obtained are stored in memories at predetermined addresses of the RAM as the integrated data. The CCD control block CB continuously applies pulses in the required number of CCD integration data to the interruption terminal at a predetermined period even after the output of the interruption request pulse, and, in synchronization with the above pulses, the microcomputer MC takes in the integration data into the memories from the CCD control block CB.

Figure 16:
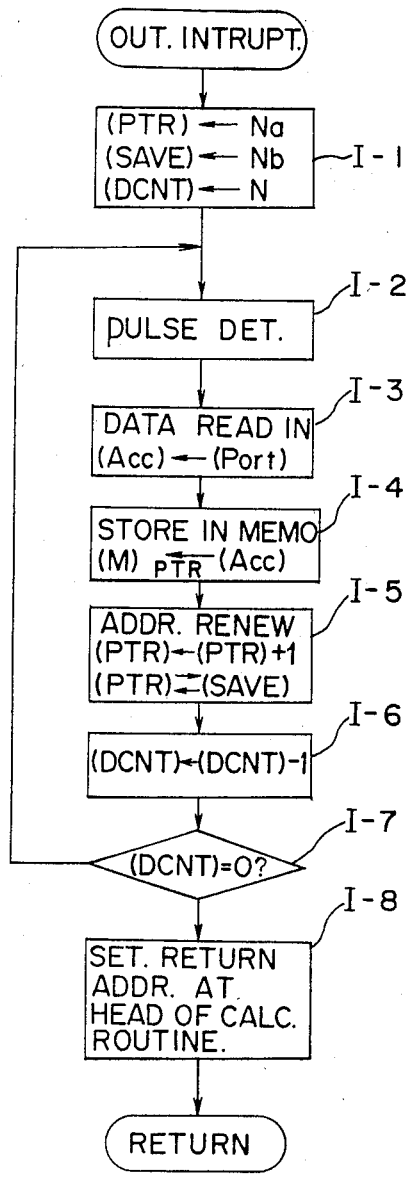
FIG. 16 is a flow-chart showing part of the functions of the circuit of FIG. 15.

FIG. 16 is a flow-chart showing the interruption processing for effecting the storing of the integration data in the focusing condition detecting arrangement of FIG. 13(A). From the cell elements in FIG. 12, the integration data are output, for example, in the order of the elements a1, b1, a2, b2 . . . and an, bn.

Figure 17:
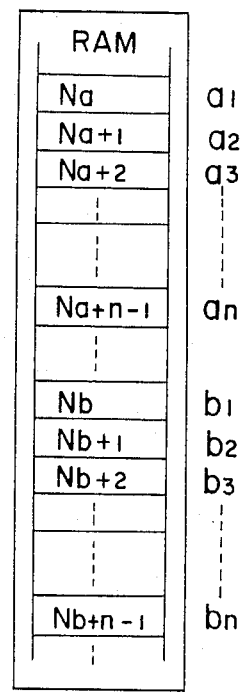
FIG. 17 is a memory map of a RAM area related to the above functions.

In FIG. 16, at a step I-1, an address Na of a memory for storing the integration data of the element a1 of the CCD device is set to a pointer PTR, and an address Nb of a memory for storing the integration data of the element b1 of the CCD device is set to a register SAVE for the pointer value temporary save, while the number of the integration data N(=2n) is further set to a counter DCNT. At a step I-2, incoming of the pulse into the interruption terminal is detected, and upon arrival of the pulse, the integrated data applied to an input/output port are fed to an accumulator at a step I-3. At a step I-4, the data in the accumulator are stored in the memory of the address represented by the pointer PTR. At a step I-5, the address of the memory for storing the subsequent data is designated. In this case, 1 is added to the content of the pointer PTR, with the result thereof being stored in the pointer PTR, and then, the contents of the pointer PTR and the register SAVE are exchanged with each other. At the step I-6, 1 is subtracted from the counter DCNT, and checking is effected at a step I-7 as to whether or not the result thereof has become zero, and if the result is not of zero, the step is reverted to the step I-1. In the manner as described above, the flow is circulated between the steps I-1 and I-7 until the content of the counter DCNT becomes zero, i.e. until the N pieces of integrated data are stored in the predetermined memory. Consequently, as shown in FIG. 17, in the addresses Na, Na+1, Na+2, . . . and Na+n−1 of the RAM, the integrated data of the elements a1, a2, a3 . . . and an are respectively stored, while in the addresses Nb, Nb+1, Nb+2, . . . and Nb+n−1, the integrated data of the elements b1, b2, b3, . . . and bn are stored. Upon completion of storing of the data, the flow is shifted to a step I-8, and a return address is set in an address of a subsequent processing step for returning.

As is clear from the foregoing description, according to the present invention, since the variation of the focusing condition display in the in-focus zone due to errors of the focusing condition detection is suppressed within such a range that the speed of the variation is not offensive to the eye, by providing a limitation at the shorter side of the period of the focusing condition detecting function, the situation which may bewilder a photographer by the rapid change of the focusing condition display can be advantageously eliminated, without impairing the response characteristic of the display (i.e. the response characteristic from the out-of-focus state to the in-focus state) when the photographer effects the operation for the focusing.

Moreover, according to the present invention, since the data for the focusing condition as obtained periodically are averaged for display, even when the objective lens is positioned in the vicinity of the in-focus position, problems related to the unstable display due to the fact that the detected data of the focusing condition are different in each cycle of the focusing condition detecting functions, can be eliminated. Additionally, the weighted average practice is adapted so that more importance is particularly placed on the data close to the present time while the objective lens is positioned in the out-of-focus zone, and therefore, a quick response of the average value of the detected data of the focusing condition, with respect to the change of the objective lens position, is available. Accordingly, such an inconvenience that, while the photographer is manipulating the objective lens as he is guided by the display of the focusing condition, the in-focus display is undesirably given after the objective lens has passed through the correct in-focus position by the delay in response of the display itself, may be prevented.

Furthermore, according to the present invention, it is so arranged that a width is imparted to the standard for judging whether or not the warning should be given so as not to respond to the variation within said width, even when the detected contrast of the object to be photographed is located in the vicinity of a lower limit of the state capable of focusing condition detection, and fluctuating up and down by various error factors.

Therefore, such undesirable state that, while one object to be photographed is aimed at, the display rapidly changes between the state capable of focusing condition detection and the state incapable of focusing condition detection, and when the photographer tries to visually adjust the focusing condition, the display indicates the state capable of focusing condition detection, etc. may be avoided, and thus, the photographer can enjoy the effect of the automatic focus condition detection without being bewildered by the display of the camera.

Accordingly, by the present invention, rapid variation of the display in the in-focus state display may be alleviated, while the accuracy in the focusing is guaranteed, and a photographic camera equipped with an efficient focus detecting system can be provided.

It should be noted here that in the foregoing embodiment, although the present invention has been mainly described with reference to the focusing condition display arrangement, the concept of the present invention is not limited in its application to such display arrangement alone, but may readily be applied to an automatic focus adjusting arrangement as well. More specifically, for example, in FIG. 1, the display circuit 32 may be replaced by a circuit OC (shown by chain lines in FIG. 1) for controlling the movement of an objective lens OL, with the display portion 34 being also replaced by an objective lens driving mechanism OD (shown by chain lines in FIG. 1) coupled to said circuit OC. In this case, the objective lens OL is subjected to the advance, retreat or stopping based on the output of the judging circuit 28. In the above construction also, such a state that the objective lens rapidly repeats the advance and retreat, etc. in the in-focus state may be advantageously prevented.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A camera with an improved focus detecting system comprising:

means for periodically sensing a focus condition of the camera to repeatedly produce a first signal in response to every periodical sensing of the focus condition, the first signal being representative of the degree of defocusing;

means for providing a reference level representative of the limit of an unacceptable defocused state for the camera;

detecting means responsive to the first signal for periodically determining whether the level of the first signal is at one side of the reference level or at the other side of the reference level with respect to every first signal repeatedly produced;

means responsive to the determining means for indicating an in-focus condition when the first signal is at the one side of the reference level with the defocusing degree less than the limit of the unacceptable defocused state; and means for modifying the first signal subject to the determination by the determining means so that the first signal to be determined is influenced by the preceding first signal, the modifying means including means for storing the preceding first signal, means for averaging the stored first signal with the first signal to be determined to get the modified first signal, and means, responsive to the averaging means, for sending the preceding modified first signal to the storing means, whereby the preceding first signal stored in the storing means is the modified one.

2. The camera according to claim 1, wherein the averaging means includes means for attaching a weight on the first signal subject to the averaging.

3. The camera according to claim 2, wherein the averaging means further includes means for varying the weight.

4. A camera with an improved focus detecting system comprising:

means for periodically detecting the focus condition of the camera relative to a subject object including means for periodically sensing the image of an object, means responsive to said sensing means for periodically determining whether or not the camera is in an in-focus condition, and means responsive to said determining means for periodically providing information of the result of the in-focus determination;

means for controlling the repetition rate of detecting the focus condition by said detecting means so as to increase the repetition rate in accordance with an increase in the object scene brightness; and means for setting a predetermined limit to the increase in the repetition rate of detecting the focus condition by said detecting means when an in-focus condition is determined by said determining means, whereby the rate of change from the in-focus information to the out-of-focus information is restrained in comparison with that from the out-of-focus information to the in-focus information when the object scene brightness is increased sufficiently to cause an increase in the repetition rate of detecting the focus by said detecting means over the predetermined limit.

5. A camera with an improved focus detecting system comprising:

means for periodically sensing a focus condition of the camera relative to a subject object and repeatedly producing a first signal in response to every periodical sensing of that focus condition, the first signal being representative of the degree of defocusing of the object by the camera;

means for storing a signal sent thereto;

means for averaging the stored contents of said storing means with the first signal in synchronism with the periodical sensing of the focus condition to produce a second signal;

means for sending the second signal to said storing means to replace the contents therein in synchronism with the periodical sensing of the focus condition, whereby the second signal is stored in said storing means as a new stored value subject to being averaged with the next first signal;

means for determining whether or not the defocusing degree represented by the second signal is within a predetermined limit of a tolerable defocusing degree; and means responsive to said determining means for indicating an in-focus condition when the focusing degree represented by the second signal is within the predetermined limit.

6. The camera according to claim 5 further comprising means for rendering the second signal identical with the first signal when said determining means determines that the stored contents in said storing means is over the limit.

7. The camera according to claim 6, wherein said rendering means includes means for reducing the weighted and value attached to the value of the signal stored in averaging to zero, so as to make the second signal identical with the first signal.

8. The camera according to claim 5 further comprising means for making the second signal identical with the first signal upon the first occurrence of the first signal.

9. The camera according to claim 1 further comprising means for making the modifying means ineffective when the determining means does not indicate an in-focus condition.

10. A camera with an improved focus detecting system comprising:

means for periodically sensing a focus condition of the camera relative to a subject object;

means responsive to said sensing means for indicating the focus condition;

indicating means responsive to said sensing means for periodically producing a signal representative of the level of reliability of the information of said indicating means;

determining means responsive to the signal for periodically determining whether the level of reliability is higher than a predetermined reference level and to disable said indicating means when the reliability is less than the reference level, the reference level being selected between a first level representative of a predetermined reliability and a second level representative of a higher reliability than the predetermined reliability; and means, responsive to said determining means, for making the first level of the reference level effective when the reliability of the signal is higher than the reference level, and for making the second level of the reference level effective when the reliability is less than the reference level.

11. The camera according to claim 10 further comprising means for making the first level effective upon the first production of the signal.

12. The camera according to claim 10 further comprising means for producing a warning when the determining means determines that the level of reliability is less than the reference level.

* * * * *